(12) United States Patent
Healey et al.

(10) Patent No.: US 11,635,507 B2
(45) Date of Patent: Apr. 25, 2023

(54) SYSTEMS FOR ESTIMATING THREE-DIMENSIONAL TRAJECTORIES OF PHYSICAL OBJECTS

(71) Applicant: Adobe Inc., San Jose, CA (US)

(72) Inventors: Jennifer Anne Healey, San Jose, CA (US); Haoliang Wang, San Jose, CA (US); Ding Zhang, Fairfax Station, VA (US)

(73) Assignee: Adobe Inc., San Jose, CA (US)

( * ) Notice: Subject to any disclaimer, the term of this patent is extended or adjusted under 35 U.S.C. 154(b) by 223 days.

(21) Appl. No.: 17/190,711

(22) Filed: Mar. 3, 2021

(65) Prior Publication Data

US 2022/0283289 A1 Sep. 8, 2022

(51) Int. Cl.
  *G01S 13/58* (2006.01)
  *G01S 7/20* (2006.01)
  *G01S 7/35* (2006.01)
(52) U.S. Cl.
  CPC .............. *G01S 13/589* (2013.01); *G01S 7/20* (2013.01); *G01S 7/352* (2013.01); *G01S 7/356* (2021.05); *G01S 13/583* (2013.01)
(58) Field of Classification Search
  CPC .............................. G01S 13/289; G01S 13/589
  See application file for complete search history.

(56) References Cited

U.S. PATENT DOCUMENTS

| 4,954,837 A | * | 9/1990 | Baird | ........................ G01S 5/00 342/458 |
| 6,085,151 A | * | 7/2000 | Farmer | ................. G01S 7/0234 701/96 |

(Continued)

OTHER PUBLICATIONS

"EPFLNews—Dynamic video-tracking for sports without physical tags", YouTube video uploaded Nov. 3, 2011 by user "EPFL" [retrieved Jan. 8, 2021]. Retrieved from the Internet <https://www.youtube.com/watch?v=YLOBvKLQa-I&feature=youtu.be>., Nov. 3, 2011, 4 pages.

(Continued)

*Primary Examiner* — Timothy A Brainard
*Assistant Examiner* — Helena H Seraydaryan
(74) *Attorney, Agent, or Firm* — FIG. 1 Patents

(57) ABSTRACT

In implementations of systems for estimating three-dimensional trajectories of physical objects, a computing device implements a three-dimensional trajectory system to receive radar data describing millimeter wavelength radio waves directed within a physical environment using beamforming and reflected from physical objects in the physical environment. The three-dimensional trajectory system generates a cloud of three-dimensional points based on the radar, each of the three-dimensional points corresponds to a reflected millimeter wavelength radio wave within a sliding temporal window. The three-dimensional points are grouped into at least one group based on Euclidean distances between the three-dimensional points within the cloud. The three-dimensional trajectory system generates an indication of a three-dimensional trajectory of a physical object corresponding to the at least one group using a Kalman filter to track a position and a velocity a centroid of the at least one group in three-dimensions.

20 Claims, 19 Drawing Sheets

(56) References Cited

U.S. PATENT DOCUMENTS

| | | | |
|---|---|---|---|
| 2012/0093359 A1* | 4/2012 | Kurien | G06V 10/96 |
| | | | 382/103 |
| 2016/0210837 A1* | 7/2016 | Allen | G08B 3/10 |
| 2020/0191943 A1* | 6/2020 | Wu | G01S 13/726 |

OTHER PUBLICATIONS

Associated Press, , "Researchers Use WiFi To See Through Walls", YouTube Video uploaded by Associated Press [retrieved Mar. 15, 2021]. Retrieved from the Internet <https://www.youtube.com/watch?v=fGZzNZnYIHo>., Dec. 21, 2015, 4 pages.

Dendorfer, Patrick et al., "CVPR19 Tracking and Detection Challenge: How crowded can it get?", arXiv.org [retrieved Jan. 8, 2021]. Retrieved from the Internet <https://arxiv.org/pdf/1906.04567.pdf>., Jun. 10, 2019, 7 pages.

Lien, Jaime et al., "Soli: ubiquitous gesture sensing with millimeter wave radar", ACM Transactions on Graphics, vol. 35, No. 4 [retrieved Mar. 15, 2021]. Retrieved from the Internet <https://dl.acm.org/doi/pdf/10.1145/2897824.2925953>., Jul. 2016, 19 pages.

Meng, Zhen et al., "Gait Recognition for Co-Existing Multiple People Using Millimeter Wave Sensing", Proceedings of the AAAI Conference on Artificial Intelligence, vol. 34, No. 01 [retrieved Mar. 15, 2021]. Retrieved from the Internet <https://ojs.aaai.org/index.php/AAAI/article/view/5430/5286>., Apr. 3, 2020, 8 pages.

Park, Sang-Wook et al., "Real-time Estimation of Trajectories and Heights of Pedestrians", 2011 International Conference on Information Science and Applications. Retrieved from the Internet <https://ieeexplore.ieee.org/document/5772407>., Apr. 2011, 8 pages.

Santhalingam, Panneer S. et al., "Expressive ASL Recognition using Millimeter-wave Wireless Signals", 2020 17th Annual IEEE International Conference on Sensing, Communication, and Networking (SECON) [retrieved Mar. 15, 2021]. Retrieved from the Internet <http://www.phpathak.com/files/exasl-secon.pdf>., Jun. 2020, 9 pages.

Santhalingam, Panneer S. et al., "mmASL: Environment-Independent ASL Gesture Recognition Using 60 GHz Millimeter-wave Signals", Proceedings of the ACM on Interactive, Mobile, Wearable and Ubiquitous Technologies [retrieved Mar. 15, 2021]. Retrieved from the Internet <http://phpathak.com/files/mmasl-ubicomp.pdf>., Mar. 2020, 30 pages.

Wang, Saiwen et al., "Interacting with Soli: Exploring Fine-Grained Dynamic Gesture Recognition in the Radio-Frequency Spectrum", UIST '16: Proceedings of the 29th Annual Symposium on User Interface Software and Technology [retrieved Mar. 15, 20201]. Retrieved from the Internet <https://cse.buffalo.edu/faculty/dimitrio/courses/cse709_s17/material/papers/deep_soli.pdf>., Oct. 2016, 10 pages.

Yang, Xin et al., "MU-ID: Multi-user Identification Through Gaits Using Millimeter Wave Radios", IEEE Infocom 2020—IEEE Conference on Computer Communications [retrieved Mar. 15, 2021]. Retrieved from the Internet <https://www.neilyxin.com/resources/conference/yang2020muid.pdf>., Jul. 2020, 10 pages.

Zhao, Peijun et al., "mID: Tracking and Identifying People with Millimeter Wave Radar", 15th International Conference on Distributed Computing in Sensor Systems (DCOSS). Retrieved from the Internet <https://ieeexplore.ieee.org/abstract/document/8804831>., May 2019.

\* cited by examiner

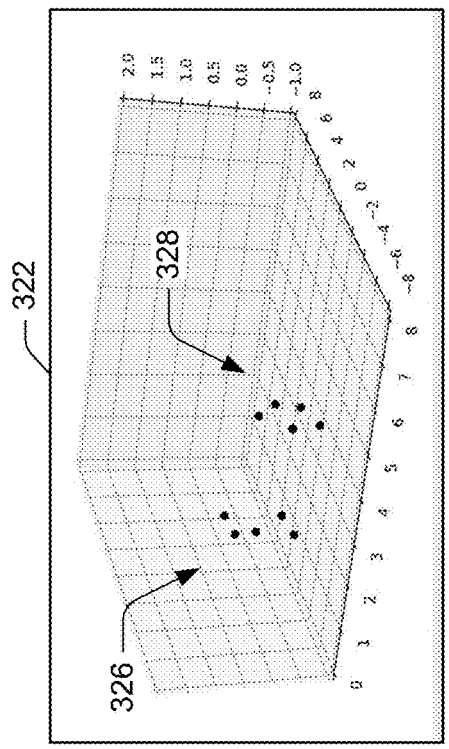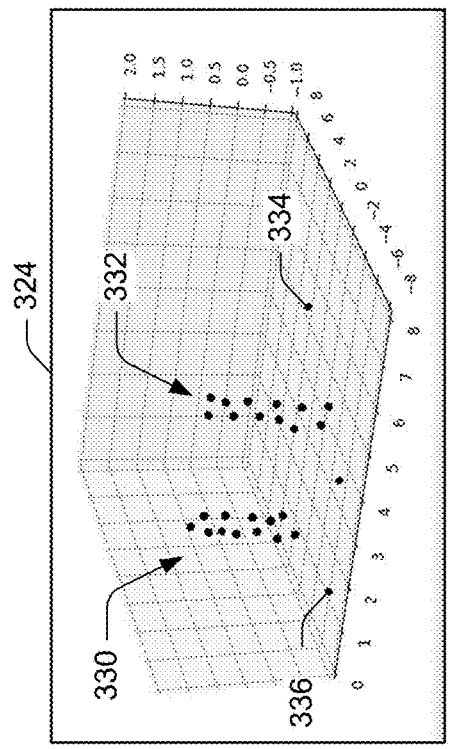
Fig. 5B

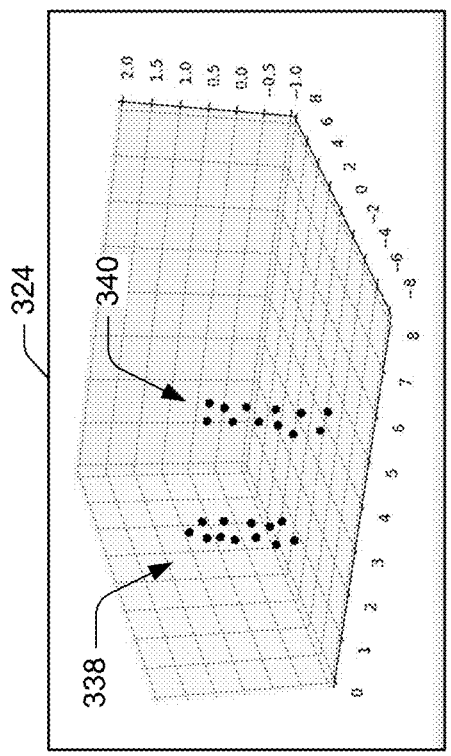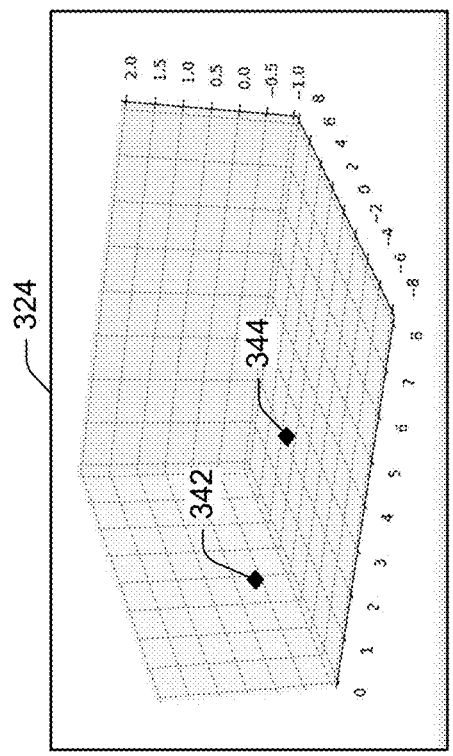
Fig. 3C

400

402
Receive radar data describing millimeter wavelength radio waves directed within a physical environment using beamforming and reflected from physical objects in the physical environment

404
Generate a cloud of three-dimensional points based on the radar data, each of the three-dimensional points corresponding to a reflected millimeter wavelength radio wave within a sliding temporal window

406
Group the three-dimensional points into at least one group based on Euclidean distances between the three-dimensional points within the cloud

408
Generate, for display in a user interface of a display device, an indication of a three-dimensional trajectory of a physical object corresponding to the at least one group using a Kalman filter to track a position and a velocity of a centroid of the at least one group in three-dimensions

*Fig. 4*

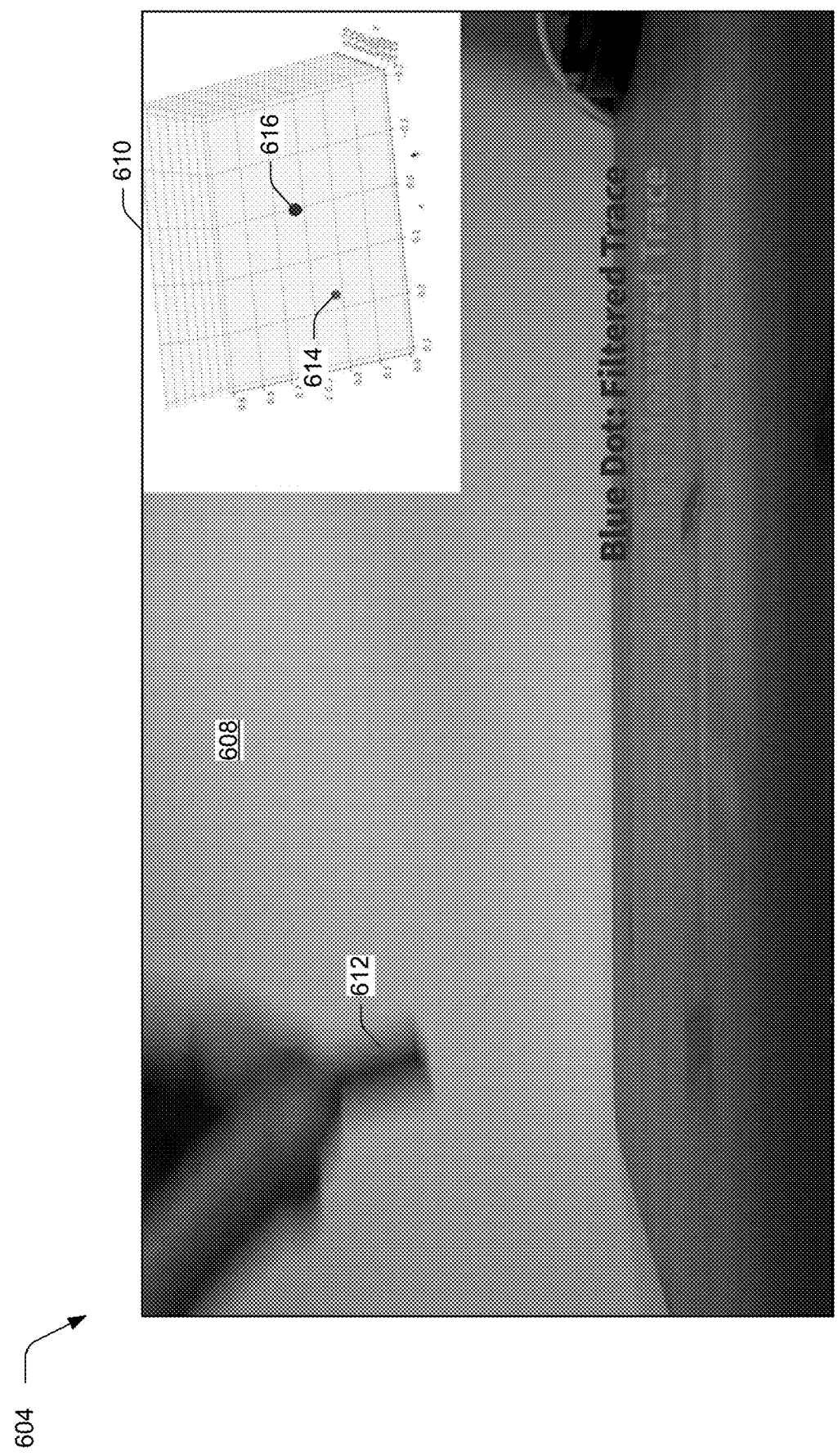

SYSTEMS FOR ESTIMATING THREE-DIMENSIONAL TRAJECTORIES OF PHYSICAL OBJECTS

BACKGROUND

Trajectory estimation of physical objects such as humans is useful for evaluating and optimizing layouts of physical environments, monitoring traffic flow patterns, and so forth. Systems for human trajectory estimation typically include an image capture device (e.g., a digital camera) which captures digital image data. These systems process the captured digital image data to estimate trajectories of humans depicted in digital images described by the data. However, camera-based trajectory estimation systems are subject to numerous data privacy concerns such as whether the captured digital image data will be used for purposes other than trajectory estimation.

Millimeter wavelength radar trajectory estimation systems are a potential alternative to camera-based systems. These systems transmit radio waves within a physical environment which reflect from physical objects in the environment. Reflected radio waves are received and processed to classify the physical objects as moving, non-moving, likely human, likely non-human, and so forth. Once classified, moving physical objects are trackable over time and it is possible to estimate trajectories of these moving physical objects. By leveraging reflected radio waves in this manner, millimeter wavelength radar trajectory estimation systems are capable of estimating trajectories for humans moving within the physical environment without the data privacy concerns associated with camera-based systems.

However, estimating trajectories using conventional millimeter wavelength radar trajectory estimation systems is challenging in three dimensions due to data sparsity. For example, raw three-dimensional data describing radio waves reflected from physical objects does not describe these reflections in high enough densities to accurately estimate three-dimensional trajectories of the physical objects. Conventional systems overcome this data sparsity by projecting the raw data in three dimensions (e.g., x, y, z) onto a two-dimensional plane (e.g., x, y). The projected data has sufficient density to estimate trajectories in two-dimensions.

SUMMARY

Techniques and systems are described for estimating three-dimensional trajectories of physical objects. In an example, a computing device implements a three-dimensional trajectory system to receive radar data describing millimeter wavelength radio waves directed within a physical environment using beamforming and reflected from physical objects that are moving within the physical environment. For example, multiple millimeter wavelength radio waves are transmitted in the physical environment simultaneously and coherently such that the radar data describes more reflected radio waves from the physical objects than in an example in which the millimeter wavelength radio waves are directed within the physical environment omnidirectionally.

The three-dimensional trajectory system generates a cloud of three-dimensional points based on the radar data. In one example, each of these three-dimensional points corresponds to a reflected millimeter wavelength radio wave within a sliding temporal window. For example, the sliding temporal window corresponds to a most recent period of time and the temporal window excludes reflected radio waves received before the most recent period of time.

The three-dimensional trajectory system groups the three-dimension points into at least one group based on Euclidean distances between the three-dimensional points within the cloud. In an example, the at least one group of the three-dimensional points corresponds to a physical object of the physical objects that are moving in the physical environment. The three-dimensional trajectory system generates an indication of a three-dimensional trajectory of the physical object for display in a user interface using a Kalman filter to track a position and a velocity of a centroid of the at least one group in three-dimensions.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, and 3D illustrate an example of estimating three-dimensional trajectories of physical objects.

FIG. 4 is a flow diagram depicting a procedure in an example implementation in which radar data describing millimeter wavelength radio waves is received and an indication of a three-dimensional trajectory of a physical object is generated for display in a user interface of a display device.

FIGS. 5A, 5B, 5C, 5D, 5E, and 5F illustrate an example of estimating three-dimensional trajectories of physical objects.

FIGS. 6A, 6B, 6C, and 6D illustrate an example of estimating a three-dimensional trajectory of a physical object.

DETAILED DESCRIPTION

Overview

Figure 1:
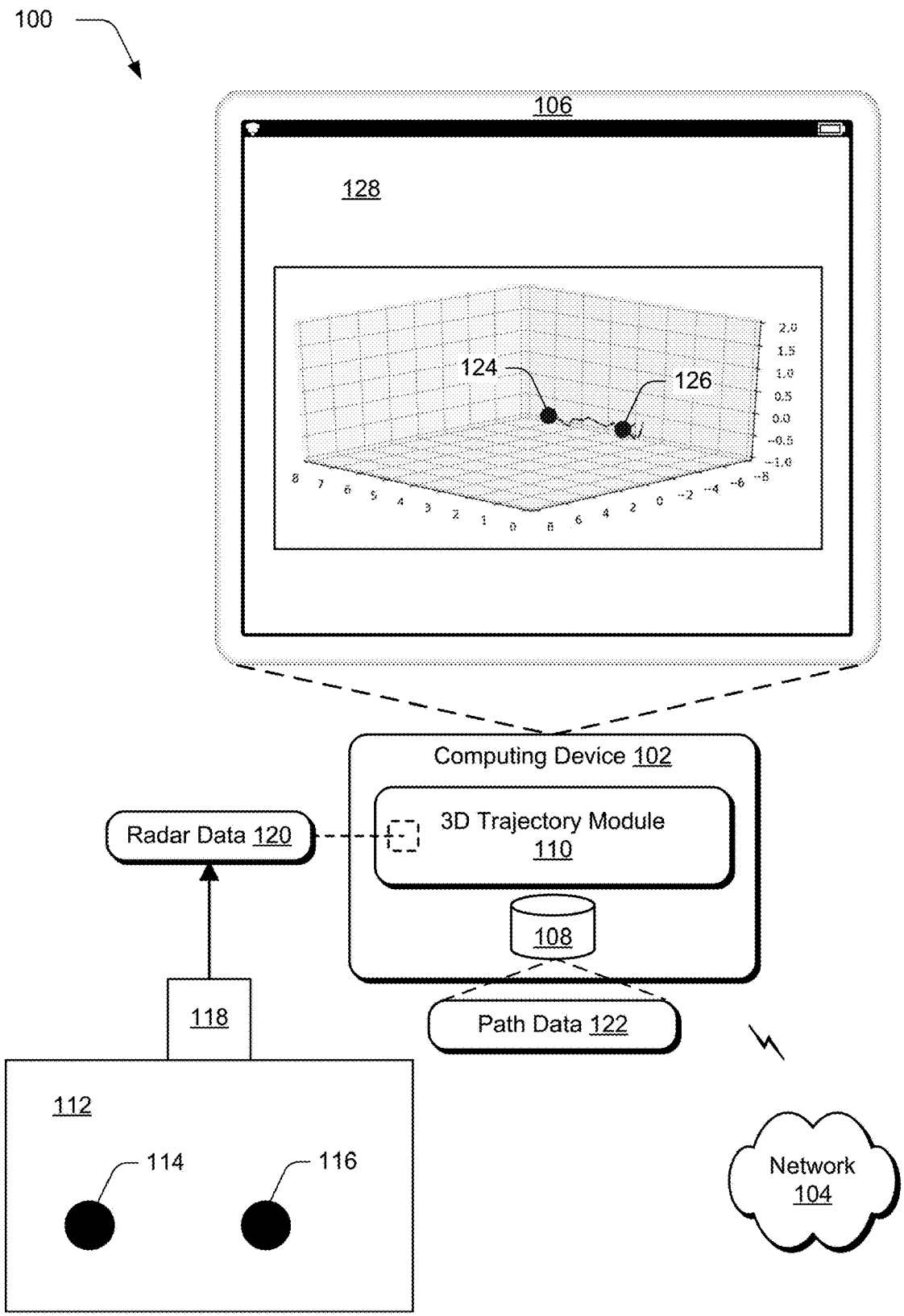
FIG. 1 is an illustration of an environment in an example implementation that is operable to employ digital systems and techniques for estimating three-dimensional trajectories of physical objects as described herein.

Conventional millimeter wavelength radar trajectory estimation systems are not capable of accurately estimating three-dimensional trajectories of physical objects within a physical environment because radio waves reflected from the physical objects are difficult to distinguish from noise.

This difficulty results in sparsity of three-dimensional data describing a three-dimensional representation of the physical environment. Conventional systems overcome the data sparsity by projecting the data in three dimensions (e.g., x, y, z) onto a two-dimensional plane (e.g., x, y). The projected data has sufficient density to estimate trajectories; however, the trajectories estimated based on the projected data are limited to two-dimensions (e.g., x, y). In order to overcome the limitations of conventional systems, techniques and systems are described for estimating three-dimensional trajectories of physical objects.

In an example, a computing device implements a three-dimensional trajectory system to receive radar data describing millimeter wavelength radio waves directed within a physical environment using beamforming and reflected from physical objects that are moving within the physical environment. The three-dimensional trajectory system receives the radar data from a radar system that includes multiple transmitting antennae for transmitting radio waves and multiple receiving antennae for receiving reflected radio waves. For example, the radar system directs the radio waves within the physical environment using beamforming by transmitting multiple millimeter wavelength radio waves in the physical environment simultaneously and coherently which focuses a field of view of the radar system. This focused field of view corresponds to a higher gain for the reflected radio waves which improves a signal-to-noise ratio as the reflected radio waves are received by the receiving antennae of the radar system. By improving the signal-to-noise ratio in this way, the radar system generates the radar data as describing more reflected radio waves from the physical objects than in an example in which the millimeter wavelength radio waves are directed within the physical environment omnidirectionally.

The three-dimensional trajectory system receives and processes the radar data and removes reflected radio waves described by the radar data which reflected from static objects in the physical environment. For example, the three-dimensional trajectory system determines a position and a velocity of each target within the physical environment that reflects a millimeter wavelength radio wave. The three-dimensional trajectory system removes reflected millimeter wavelength radio waves from the radar data that reflected from targets having velocities below a threshold velocity or no velocity.

The three-dimensional trajectory system generates a cloud of three-dimensional points in a three-dimensional representation of the physical environment based on the radar data. For example, each of these three-dimensional points corresponds to a reflected millimeter wavelength radio wave within a temporal window. In one example, the temporal window is sliding window corresponding to a most recent period of time, e.g., a most recent 100 milliseconds. Since the physical objects are moving within the physical environment, the sliding temporal window removes reflected radio waves outside of the most recent period of time because these radio waves reflected from the physical objects in previous positions within the physical environment. Similarly, reflected radio waves included in the sliding temporal window reflect from the physical objects in their current positions within the physical environment. For example, the sliding temporal window also reduces a risk of high variation between the reflected millimeter wavelength radio waves which increases detectability of the physical objects.

Euclidean distances are computed between the three-dimensional points within the cloud in an x-plane, a y-plane, and a z-plane of the three-dimensional representation of the physical environment. The three-dimensional trajectory module 110 groups the three-dimension points into a least one group based on the computed Euclidean distances between the three-dimensional points. In one example, the three-dimensional trajectory system groups the three-dimensional points into the at least one group using density-based spatial clustering of applications with noise. For example, the at least one group of the three-dimensional points corresponds to a physical object of the physical objects that are moving in the physical environment. The three-dimensional trajectory system generates an indication of a three-dimensional trajectory of the physical object for display in a user interface using a Kalman filter to track a position and a velocity of a centroid of the at least one group in the x-plane, the y-plane, and the z-plane. In an example, the indication of the three-dimensional trajectory is displayed relative to the three-dimensional representation of the physical environment.

The described systems improve conventional millimeter wavelength radar trajectory estimation systems which are limited to estimating trajectories in two dimensions based on a two-dimensional projection of sparse three-dimensional data. Unlike conventional systems, the described systems are capable of accurately estimating three-dimensional trajectories of the physical objects moving in the physical environment. This is because the described systems direct the millimeter wavelength radio waves within the physical environment using beamforming and remove a portion of the reflected millimeter wavelength radio waves from the radar data using the sliding temporal window. By improving conventional millimeter wavelength radar technology in this way, the described systems are capable of tracking large physical objects such as humans in three-dimensions and are also capable of tracking small objects such as a human hand in three-dimensions. For example, the described systems are capable of estimating three-dimensional trajectories of humans without identifying the humans or capturing data usable to identify the humans. The ability of the described systems to track physical objects in three-dimensions also makes these systems usable in augmented reality environments, virtual reality environments, and so forth.

Term Examples

As used herein, the term "beamforming" refers to techniques in which multiple millimeter wavelength radio waves are transmitted simultaneously and coherently to achieve a higher gain and/or a longer range in a main focused field of view of a radar system. By way of example, transmitting millimeter wavelength radio waves using beamforming achieves a higher gain in a particular direction within a physical environment unlike transmitting millimeter wavelength radio waves omnidirectionally within the physical environment.

As used herein, the term "sliding temporal window" refers to a most recent period of time. By way of example, the sliding temporal window excludes reflected millimeter wavelength radio waves that are outside of the temporal window.

As used herein, the term "trajectory" of a physical object refers to a path followed by the physical object moving through a physical environment. By way of example, a three-dimensional trajectory of a physical object is a three-dimensional path followed by the physical object moving through a physical environment.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a three-dimensional trajectory module 110.

As shown, the environment 100 includes a physical environment 112 which is an enclosed indoor environment in one example. However, in other examples the physical environment 112 is an open environment such as an outdoor environment. A first physical object 114 and a second physical object 116 are moving within the physical environment 112. For example, the first physical object 114 is a first person walking in the physical environment 112 and the second physical object 116 is a second person that is also walking in the physical environment 112.

The environment 100 includes a radar system 118 which is a frequency modulated continuous wave radar system in one example. The radar system 118 transmits millimeter wavelength radio waves within the physical environment 112 and these radio waves reflect from portions of the physical environment 112 as well as from the first and second physical objects 114, 116. For example, the radar system 118 includes multiple transmitting antennae for transmitting the millimeter wavelength radio waves. The radar system 118 also includes multiple receiving antennae which receive reflected millimeter wavelength radio waves.

Consider an example in which the radar system 118 transmits a millimeter wavelength radio wave within the physical environment 112 at a specific angle relative to the radar system 118. In this example, the millimeter wavelength radio wave reflects from a portion of the first physical object 114 at a different angle and the reflected radio wave is received by a first receiving antenna and a second receiving antenna of the radar system 118. For example, the radar system 118 computes a frequency difference between the transmitted and reflected radio wave and generates an intermediate frequency signal based on this difference using a mixer. A distance between the portion of the first physical object 114 and the radar system 118 is computable by performing a range fast Fourier transform on the intermediate frequency signal.

There is a phase difference between the reflected radio wave received by the first receiving antenna and the reflected radio wave received by the second receiving antenna because of a distance between the first and second receiving antennae. The radar system 118 determines the different angle of the reflected millimeter wavelength radio wave using this phase difference and the distance between the first and second receiving antennae. In addition, the radar system 118 computes a velocity of the portion of the first physical object 114 by transmitting multiple millimeter wavelength radio waves within the physical environment 112. In this example, the radar system 118 computes the velocity by performing a doppler fast Fourier transform on an outcome of the range fast Fourier transform of the corresponding intermediate frequency signal as multiple millimeter wavelength radio waves reflected from the portion of the first physical object 114 are received by the receiving antennae.

The radar system 118 leverages the different angle and the distance between the portion of the first physical object 114 and the radar system 118 to generate a three-dimensional point in a three-dimensional representation of the physical environment 112. For example, the three-dimensional representation of the physical environment 112 is a rendering of three-dimensional scene data describing the physical environment 112. In this example, the three-dimensional point corresponds to a position of the portion of the first physical object 114 within the physical environment 112.

In one example, the radar system 118 transmits the radio waves omnidirectionally within the physical environment 112. In another example, the radar system 118 directs the millimeter wavelength radio waves within the physical environment 112 using beamforming which leverages phase shifting and focuses a field of view of the radar system 118. For example, each transmitting antenna of the radar system 118 includes a 6-bit configurable phase register with a step size of 5.625 degrees. In this example, the focused field of view corresponds to a higher gain for reflected millimeter wavelength radio waves which improves a signal-to-noise ratio for the reflected radio waves as they are received by the receiving antennae of the radar system 118. By employing beamforming in this way, the radar system 118 is capable of generating more information about the physical environment 112 and/or the first and second physical objects 114, 116 than in the example in which the radar system 118 transmits and/or receives the radio waves omnidirectionally.

In the illustrated example, the radar system 118 transmits and/or receives multiple millimeter wavelength radio waves within the physical environment 112 using beamforming. In order to track the first and second physical objects 114, 116 over a period of time within the physical environment 112, the radar system 118 implements a sliding temporal window which filters out reflected radio waves received outside of the temporal window. For example, this temporal window corresponds to a period of time that is less than 300 milliseconds such as 100 milliseconds.

As shown, the radar system 118 generates radar data 120 as describing the millimeter wavelength radio waves directed within the physical environment 112 using beamforming and reflected from portions of the physical environment 112 and the first and second physical objects 114, 116. The three-dimensional trajectory module 110 receives the radar data 120, e.g., via the network 104, and processes the radar data 120 to generate and update path data 122. For example, the three-dimensional trajectory module 110 identifies radio waves described by the radar data 120 that reflected from portions of the physical environment 112 and removes these reflected radio waves from the radar data 120.

In one example, the three-dimensional trajectory module 110 identifies the millimeter wavelength radio waves that reflected from portions of the physical environment 112 based on arrival times of the reflected radio waves. The three-dimensional trajectory module 110 also identifies radio waves described by the radar data 120 which reflected from static or non-moving objects within the physical environment 112. For example, the three-dimensional trajectory module 110 computes velocities for targets in the physical environment 112 that reflect the millimeter wavelength radio waves and removes reflected radio waves from the radar data 120 that correspond to targets having velocities below a threshold velocity or no velocity.

After removing the millimeter wavelength radio waves from the radar data 120 that reflected from the static targets and the portions of the physical environment 112, the three-dimensional trajectory module 110 generates a three-dimensional point in the three-dimensional representation of the physical environment 112 for the remaining reflected radio waves described by the radar data 120. In one example, the three-dimensional trajectory module 110 generates clouds of these three-dimensional points. In this example, the three-dimensional trajectory module 110 groups the three-dimensional points into groups based on Euclidean distances between the three-dimensional points within the clouds.

The three-dimensional trajectory module 110 groups the three-dimensional points into a particular number of groups based on the Euclidean distances. For example, the particular number of groups is equal to a number of the first and second physical objects 114, 116 moving within the physical environment 112. In this example, the particular number of groups is two and this number is based on the Euclidean distances between the three-dimensional points which correspond to the reflected radio waves included in the sliding temporal window. The first group includes three-dimensional points generated based on radio waves reflected from portions of the first physical object 114 and the second group includes three-dimensional points generated based on radio waves reflected from portions of the second physical object 116. In an example, the three-dimensional trajectory module 110 computes a first centroid of the first group and a second centroid of the second group in the three-dimensional representation of the physical environment 112.

In one example, the three-dimensional trajectory module 110 generates a first indication 124 of the first physical object 114 in the physical environment 112 based on a position and a velocity of the first centroid. In this example, the three-dimensional trajectory module 110 generates a second indication 126 of the second physical object 116 in the physical environment 112 based on a position and a velocity of the second centroid. As shown, the first and second indications 124, 126 are displayed relative to the three-dimensional representation of the physical environment 112 in a user interface 128 of the display device 106.

Although the three-dimensional trajectory module 110 is capable of generating the first and second indications 124, 126 based on the first and second centroids, respectively, in some examples, the three-dimensional trajectory module 110 leverages the path data 122 to generate the first and second indications 124, 126 with increased accuracy. For example, the path data 122 describes path objects which each correspond to a detected physical object moving in the physical environment 112. The three-dimensional trajectory module 110 uses the path objects to maintain three-dimensional coordinates of positions of the physical objects within the physical environment 112 when the physical objects were detected previously.

Consider an example in which the three-dimensional trajectory module 110 attempts to associate the first centroid with a path object described by the path data 122. To do so, the three-dimensional trajectory module 110 determines distances between the first centroid and centers of most recent sets of the three-dimensional coordinates for each path object described by the path data 122. In this way, the three-dimensional trajectory module 110 compares an approximate three-dimensional position of the first physical object 114 with most recent three-dimensional positions of physical objects detected as moving within the physical environment 112.

The three-dimensional trajectory module 110 associates the first centroid with a path object having a most recent three-dimensional position which is closest to a three-dimensional position of the first centroid. If the three-dimensional trajectory module 110 is unable to associate the first centroid with a path object described by the path data 122, then a new path object is generated and the three-dimensional position of the first centroid is assigned to a most recent three-dimensional position of the new path object. For example, if a distance between the three-dimensional position of the first centroid and a closest most recent three-dimensional position of a path object described by the path data 122 is greater than a threshold distance, then the three-dimensional trajectory module 110 generates the new path object and updates the path data 122 as describing the new path object.

Once the first centroid is associated with a particular path object, a six state Kalman filter is used along with a velocity and position of the first centroid and previous three-dimensional positions included in the particular path object to estimate a current position and/or velocity for the first physical object 114 in one example. The three-dimensional trajectory module 110 generates the first indication 124 based on this current position and/or velocity. In a similar manner, the three-dimensional trajectory module 110 associates the second centroid with a different path object described by the path data 122 having a most recent three-dimensional position which is closest to a three-dimensional position of the second centroid. The six state Kalman filter is also used to estimate a current position and/or velocity for the second physical object 116 based on a velocity and position of the second centroid and previous three-dimensional positions included in the different path object. The three-dimensional trajectory module 110 generates the second indication 126 based on the current position and/or velocity for the second physical object 116.

In the example in which the first physical object 114 is the first person and the second physical object 116 is the second person, the three-dimensional trajectory module 110 is capable of tracking movements of the first and second person within the physical environment 112 without identifying the first person or the second person or capturing data usable to identify the first person or the second person. For example, the three-dimensional trajectory module 110 generates the indications 124, 126 without using an image capture device such as a digital camera. In another example, the three-dimensional trajectory module 110 generates the indications 124, 126 as part of an augmented reality environment, a virtual reality environment, etc.

Figure 2:
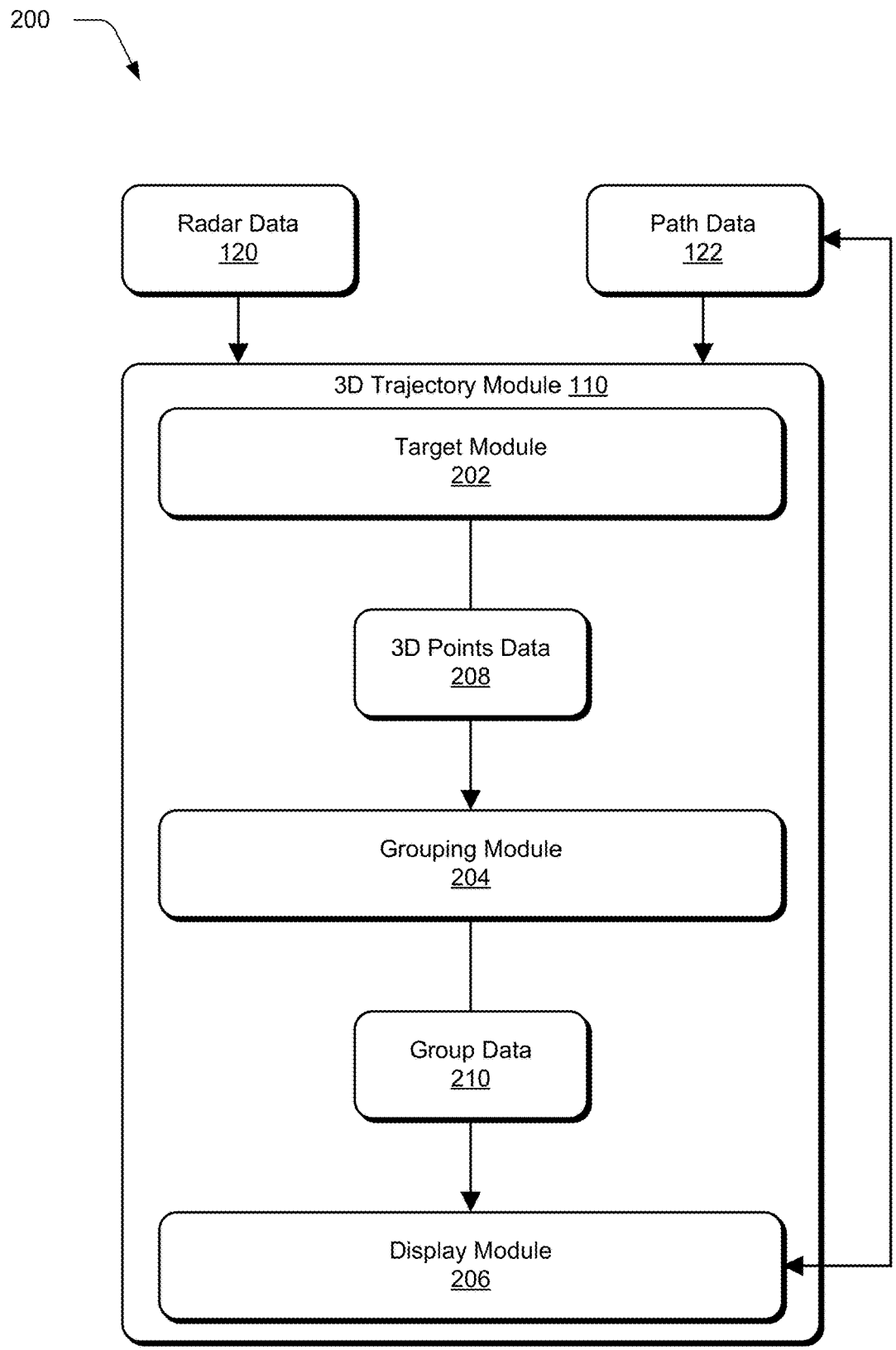
FIG. 2 depicts a system in an example implementation showing operation of a three-dimensional trajectory module for estimating three-dimensional trajectories of physical objects.

FIG. 2 depicts a system 200 in an example implementation showing operation of a three-dimensional trajectory module 110. The three-dimensional trajectory module 110 is illustrated to include a target module 202, a grouping module 204, and a display module 206. The three-dimensional trajectory module 110 receives the radar data 120 as an input. In one example, the three-dimensional trajectory module 110 also receives the path data 122 as an input. In other examples, the three-dimensional trajectory module 110 generates and updates the path data 122. As shown, the target module 202 receives the radar data 120 and processes the radar data 120 to generate three-dimensional points data 208.

Figure 3A:
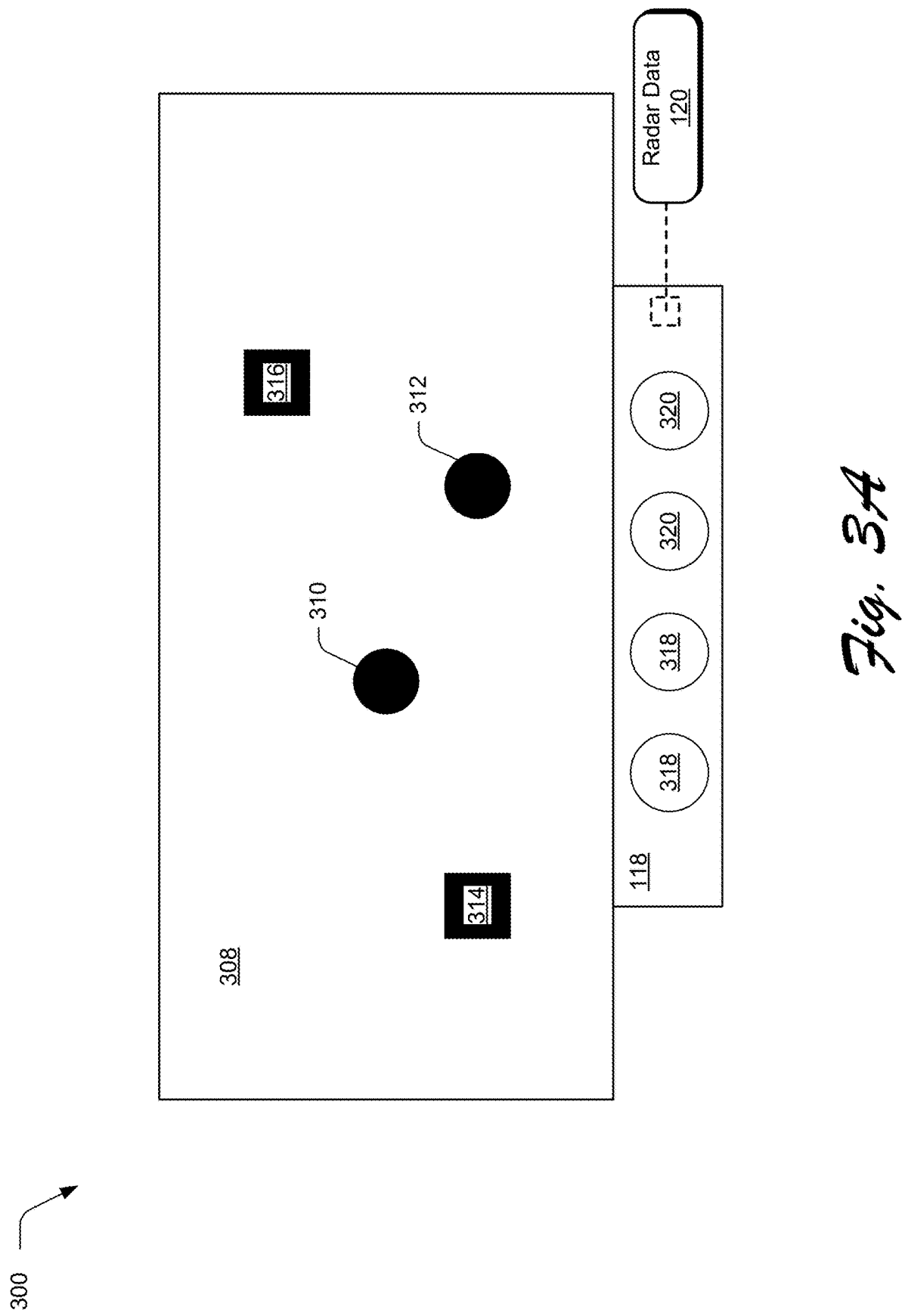

FIGS. 3A, 3B, 3C, and 3D illustrate an example of estimating three-dimensional trajectories of physical objects. FIG. 3A illustrates a representation 300 of generating radar data 120 using beamforming. FIG. 3B illustrates a representation 302 of three-dimensional points described by radar data 120 generated without beamforming and three-dimensional points described by radar data 120 generated using beamforming. FIG. 3C illustrates a representation 304 of detected/measured physical objects moving within a physical environment. FIG. 3D illustrates a representation 306 of generated indications of three-dimensional positions and/or velocities of the physical objects within the physical environment.

With reference to FIG. 3A, the representation 300 includes a physical environment 308 and a radar system 118. A first physical object 310 is moving within the physical environment 308 and a second physical object 312 is also moving within the physical environment 308. First and second static objects 314, 316 are disposed within the physical environment 308 but are not moving within the physical environment 308. As shown, the radar system 118 includes transmitting antennae 318 and receiving antennae 320. For example, each transmitting antenna 318 includes a 6-bit configurable phase register with a step size of 5.625 degrees. In one example, each transmitting antenna 318 includes multiple phase registers. In another example, each transmitting antenna 318 includes a phase register with a step size of greater than 5.625 degrees or less than 5.625 degrees.

The radar system 118 uses the transmitting antennae 318 to transmit millimeter wavelength radio waves into the physical environment 308 using beamforming. To do so, the radar system 118 transmits multiple millimeter wavelength radio waves into the physical environment 308 simultaneously and coherently to achieve a higher gain in a main focused field of view of the radar system 118 which is the physical environment 308 in this example. The multiple radio waves reflect from the first and second physical objects 310, 312 and the first and second static objects 314, 316 and are received by the receiving antennae 320.

Since the reflected millimeter wavelength radio waves are transmitted using beamforming in this example, the receiving antennae 320 receives the reflected radio waves having a higher gain than in an example in which the millimeter wavelength radio waves are transmitted omnidirectionally. This improves a signal-to-noise ratio for the reflected radio waves and improves the radar system's 118 ability to distinguish the reflected radio waves from noise at the receiving antennae 320. By improving the radar system's 118 ability to identify the reflected millimeter wavelength radio waves in this way, the radar system 118 generates the radar data 120 as describing more information about the first and second physical objects 310, 312 than an example in which the radar data 120 is generated without using beamforming.

As shown in FIG. 2, the target module 202 receives the radar data 120 which describes millimeter wavelength radio waves transmitted within the physical environment 308 and reflected from the from the first and second physical objects 310, 312 and the first and second static objects 314, 316. The target module 202 applies a sliding temporal window to the radar data 120 and removes reflected radio waves described by the radar data 120 that are outside of the temporal window. In one example, the temporal window corresponds to a period of time equal to 100 milliseconds. For example, removing the reflected millimeter wavelength radio waves that are outside of the temporal window improves the three-dimensional trajectory module's 110 ability to detect the first and second physical objects 310, 312 within the physical environment 308. This is because the first and second physical objects 310, 312 are moving within the physical environment 308 and the reflected radio waves that are outside of the temporal window reflect from different positions within the physical environment 308 as the first and second physical objects 310, 312 are moving. In one example, including the reflected radio waves that are outside of the temporal window increases difficulty in establishing meets and bounds of the first and second physical objects 310, 312. In this example, clustering three-dimensional points corresponding to reflected radio waves from both current positions and historic positions of the first and second physical objects 310, 312 generally results in clusters having centroids indicating positions which do not closely correspond to the current positions of the first and second physical objects 310, 312 within the physical environment 308.

The target module 202 also removes radio waves described by the radar data 120 that reflected from the first and second static objects 314, 316 and that reflected from portions of the physical environment 308. For example, the target module 202 computes a velocity of targets in the physical environment 308 that reflect the millimeter wavelength radio waves and removes the radio waves described by the radar data 120 reflected from targets having velocities below a threshold velocity. In one example, the target module 202 removes radio waves described by the radar data 120 that have arrival times greater than a threshold arrival time. In this example, the radio waves having the arrival times greater than the threshold arrival time are reflected from portions of the physical environment 308.

The target module 202 generates the three-dimensional points data 208 as describing millimeter wavelength radio waves transmitted within the physical environment 308 using beamforming and reflected from the first and second physical objects 310, 312 within the temporal window. The grouping module 204 receives the three-dimensional points data 208 and processes the three-dimensional points data 208 to generate group data 210. The representation 302 illustrated in FIG. 3B includes a three-dimensional representation 322 of the physical environment 308 generated without leveraging beamforming or the temporal window as well as a three-dimensional representation 324 of the physical environment 308 generated using beamforming and the temporal window.

As shown, the three-dimensional representation 322 includes a first sparse cloud 326 of three-dimensional points and a second sparse cloud 328 of three-dimensional points. Each of the three-dimensional points included in the first sparse cloud 326 corresponds to a millimeter wavelength radio wave reflected from the first physical object 310 in the physical environment 308. Similarly, each of the three-dimensional points included in the second sparse cloud 328 corresponds to a millimeter wavelength radio wave reflected from the second physical object 312 in the physical environment 308. Since the first and second sparse clouds 326, 328 include very few three-dimensional points, the first and second sparse clouds 326, 328 are not usable for tracking the first and second physical objects 310, 312 within the physical environment 308. For example, attempting to group the three-dimensional points included in the first and second sparse clouds 326, 328 into groups based on Euclidean distances between the three-dimensional points included in the first and second sparse clouds 326, 328 results in a single group of three-dimensional points having a centroid with a position that is not representative of a position of the first physical object 310 or a position of the second physical object 312 within the physical environment 308.

The three-dimensional representation 324 includes a first cloud of three-dimensional points 330 and a second cloud of three-dimensional points 332. As shown, the first and second clouds of three-dimensional points 330, 332 each include many three-dimensional points. Unlike the first and second sparse clouds 326, 328 which are not usable for tracking the first and second physical objects 310, 312 within the physical environment 308, the first and second clouds of three-dimensional points 330, 332 are usable for tracking the first and second physical objects 310, 312 within the physical environment 308. For example, the first and second clouds of three-dimensional points 330, 332 include three-dimensional points for reflected radio waves which are transmitted using beamforming and which are filtered using the temporal window. Due to the use of beamforming and the temporal window, the first and second clouds of three-dimensional points 330, 332 to are dense clouds having many three-dimensional points.

The three-dimensional representation 324 also includes a first outlying three-dimensional point 334 and a second outlying three-dimensional point 336. As shown, the first outlying three-dimensional point 334 is not included within the first cloud of three-dimensional points 330 or within the second cloud of three-dimensional points 332. Similarly, the second outlying three-dimensional point 336 is not included within the first cloud of three-dimensional points 330 or within the second cloud of three-dimensional points 332. In an example, the first and second outlying three-dimensional points 334, 336 are noise.

For example, the three-dimensional points data 208 describes a reflected millimeter wavelength radio wave corresponding to each of the three-dimensional points included in the three-dimensional representation 324. The grouping module 204 processes the three-dimensional points data 208 to group the three-dimensional points into groups based on Euclidean distances between the three-dimensional points included in the first and second clouds of three-dimensional points 330, 332. As shown in FIG. 3C, the grouping module 204 groups the three-dimensional points included in the three-dimensional representation 324 into a first group 338 and a second group 340.

In one example, the grouping module 204 groups the three-dimensional points included in the three-dimensional representation 324 using density-based spatial clustering of applications with noise. In other examples, the grouping module 204 groups the three-dimensional points included in the three-dimensional representation 324 using other grouping or clustering techniques. For example, the grouping module 204 determines a number of the first and second groups 338, 340 based on Euclidean distances between the three-dimensional points included in the three-dimensional representation 324.

As illustrated, the grouping module 204 removes the first outlying three-dimensional point 334 and the second outlying three-dimensional point 336 from the three-dimensional representation 324 as part of grouping the three-dimensional points into the first and second groups 338, 340. In an example, the grouping module 204 determines a centroid of the first group 338 and represents the first group 338 as a first centroid 342. Similarly, the grouping module 204 determines a centroid of the second group 340 and represents the second group 340 as a second centroid 344. The grouping module 204 generates the group data 210 as describing the first and second groups 338, 340 and/or the first and second centroids 342, 344.

As shown in FIG. 2, the display module 206 receives the group data 210 and the path data 122 in one example. In other examples, the display module 206 generates and updates the path data 122. For example, the display module 206 determines a measured position of the first physical object 310 in the physical environment 308 and a measured velocity of the first physical object 310 in the physical environment 308 using the first centroid 342. The display module 206 also determines a measured position of the second physical object 312 in the physical environment 308 and a measured velocity of the second physical object 312 in the physical environment 308 using the second centroid 344.

The display module 206 accesses the path data 122 which describes path objects that each correspond to a detected physical object moving in the physical environment 308. For example, the display module 206 uses the path objects to maintain three-dimensional coordinates of positions of the physical objects within the physical environment 308 when the physical objects were detected previously. In this example, each of the path objects described by the path data 122 corresponds to a physical object within the physical environment 308 which has been previously detected and is likely to be detected again.

For example, the display module 206 removes old path objects from the path data 122 that have not been associated with a currently detected physical object in the physical environment 308 within a threshold timeframe. The display module 206 adds new path objects to the path data 122 for a physical object which is currently detected but not previously detected. In this example, the display module 206 adds a new path object to the path data 122 for a currently detected physical object moving within the physical environment 308 that cannot be associated with any of the path objects currently described by the path data 122.

In one example, the display module 206 generates and updates the path data 122 using a Hungarian algorithm, e.g., a linear Hungarian algorithm, to solve a many-to-many assignment of currently detected physical objects to path objects describing previously detected physical objects because a corresponding cost matrix is non-square. This is because a number of path objects (P) and a number of currently detected physical objects (O) are different in some scenarios. For example, the display module 206 defines M as the greater of P and O and constructs an M×M matrix T where $T_{p,o}$ represents a distance between a distance between a path object p and a centroid of a currently detected physical object o. If $T_{p,o}$ exceeds a threshold distance, then the display module 206 sets a corresponding cost (C) to be large so that this association will be avoided. If a currently detected physical object is mapped to an augmented dimension of matrix T or to a dimension of matrix T with cost C, then the display module 206 generates a new path object for the currently detected physical object. Similarly, if a particular path object is mapped to an augmented dimension of matrix T or to a dimension of matrix T with cost C, then the display module 206 determines that the particular path object is not associated with a detected physical object. By generating and updating the path data 122 in this way, the display module 206 maintains associations between path objects detected physical objects.

For each track object described by the path data 122, the display module 206 maintains a state which includes variables for positions and velocities along an x-axis, a y-axis, and a z-axis in the three-dimensional representation 324. An initial state for each path object corresponds to a first detected three-dimensional position and velocity of an associated physical object in the physical environment 308. At each successive timestep, a six state Kalman filter updates state variables and a transition matrix as well as corresponding uncertainties. Based on a detected physical object's measured position and velocity, the six state Kalman filter estimates a current position and velocity as well as a new covariance. The display module 206 uses the current positions and velocities to render indications of detected physical objects in three-dimensions.

As shown in FIG. 3D, the display module 206 determines a current three-dimensional position and three-dimensional velocity of the first physical object 310 within the physical environment 308 based on the first centroid 342. The display module 206 accesses the path data 122 and identifies a first path object described by the path data 122 that is associated with the first physical object 310. The display module 206 leverages the six state Kalman filter to estimate the current three-dimensional position and three-dimensional velocity for the first physical object 310 based on the measured three-dimensional position and three-dimensional velocity of the first physical object 310 and the first path object. The display module 206 generates an indication 346 of the current three-dimensional position and/or velocity of the first physical object 310 which is displayed relative to the three-dimensional representation 324.

For example, the display module 206 determines a current three-dimensional position and three-dimensional velocity of the second physical object 312 within the physical environment 308 based on the second centroid 344. In this example, the display module 206 accesses the path data 122 and processes the path data 122 to identify a second path object that is associated with the second physical object 312. The display module 206 implements the Kalman filter to estimate the current three-dimensional position and three-dimensional velocity for the second physical object 312 based on the measured three-dimensional position and three-dimensional velocity of the second physical object 312 and the second path object. As shown, the display module 206 generates an indication 348 of the current three-dimensional position and/or velocity of the second physical object 312 which is displayed relative to the three-dimensional representation 324.

The display module 206 uses previous positions of the first physical object 310 within the physical environment 308 included in the first path object to generate an indication 350 of a first three-dimensional trajectory. As shown, the display module 206 renders the indication 350 of the first three-dimensional trajectory which is displayed relative to the three-dimensional representation 324. The display module 206 also uses previous positions of the second physical object 312 within the physical environment 308 included in the second path object to generate an indication 352 of a second three-dimensional trajectory. As illustrated in FIG. 3D, the display module 206 renders the indication 352 of the second three-dimensional trajectory which is also displayed relative to the three-dimensional representation 324.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which radar data describing millimeter wavelength radio waves is received and an indication of a three-dimensional trajectory of a physical object is generated for display in a user interface of a display device.

Radar data describing millimeter wavelength radio waves directed within a physical environment using beamforming and reflected from physical objects in the physical environment is received (block 402). The computing device 102 implements the three-dimensional trajectory module 110 to receive the radar data in one example. A cloud of three-dimensional points is generated based on the radar data (block 404), each of the three-dimensional points corresponding to a reflected millimeter wavelength radio wave within a sliding temporal window. For example, the three-dimensional trajectory module 110 generates the cloud of three-dimensional points based on the radar data.

The three-dimensional points are grouped into at least one group based on Euclidean distances between the three-dimensional points within the cloud (block 406). In one example, the computing device 102 implements the three-dimensional trajectory module 110 to group the three-dimensional points into the at least one group. An indication of a three-dimensional trajectory of a physical object corresponding to the at least one group is generated for display in a user interface of a display device using a Kalman filter to track a position and a velocity of a centroid of the at least one group in three-dimensions (block 408). For example, the three-dimensional trajectory module 110 generates the indication of the three-dimensional trajectory of the physical object.

Figure 5D:
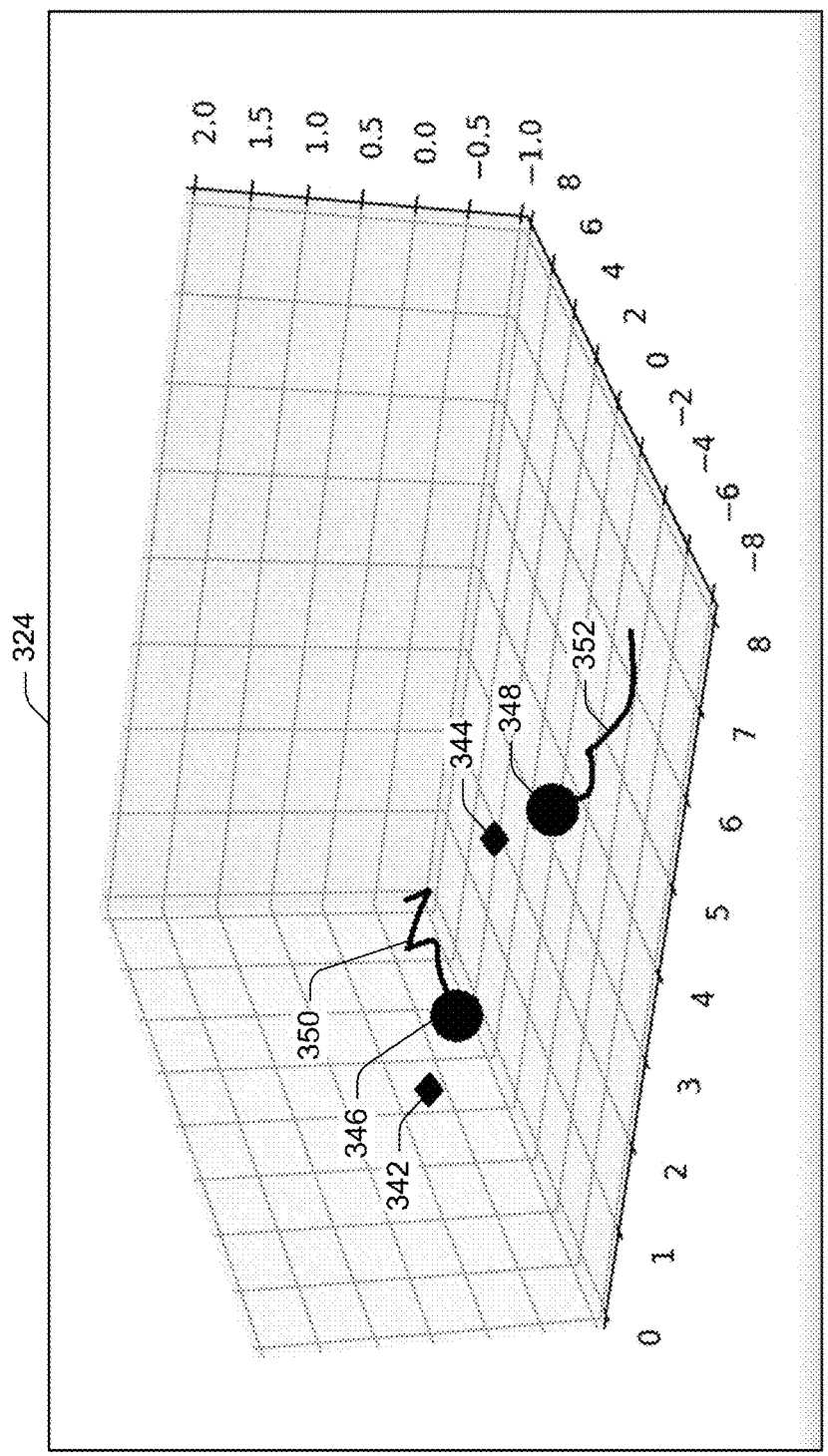
Figure 5A:
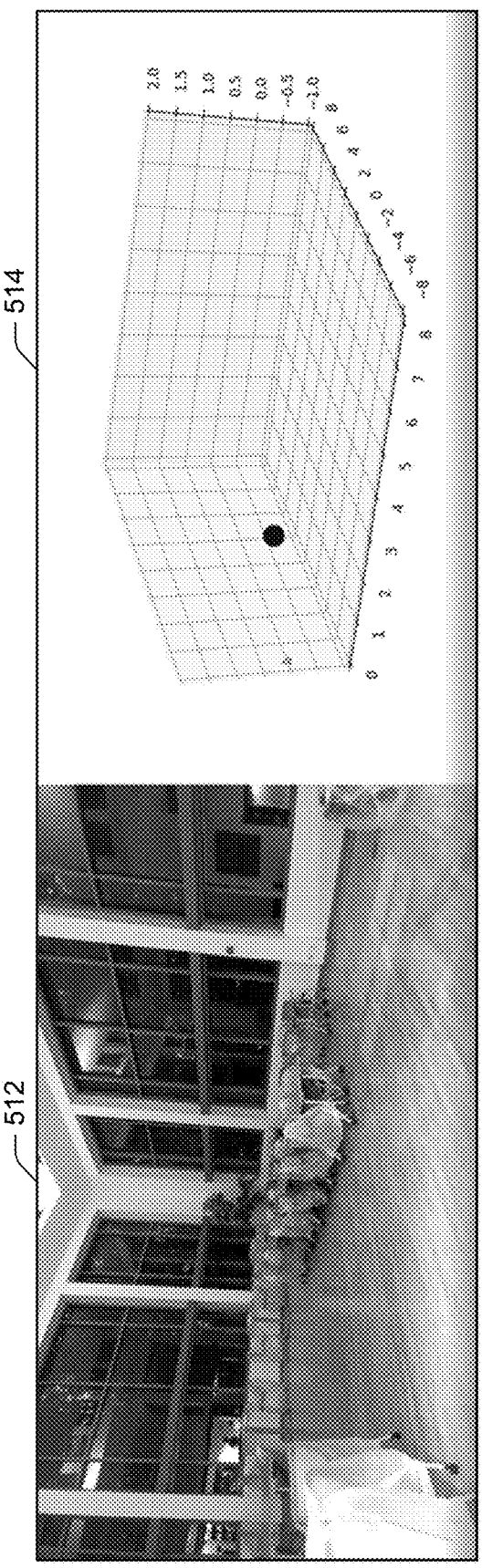
Figure 5B:
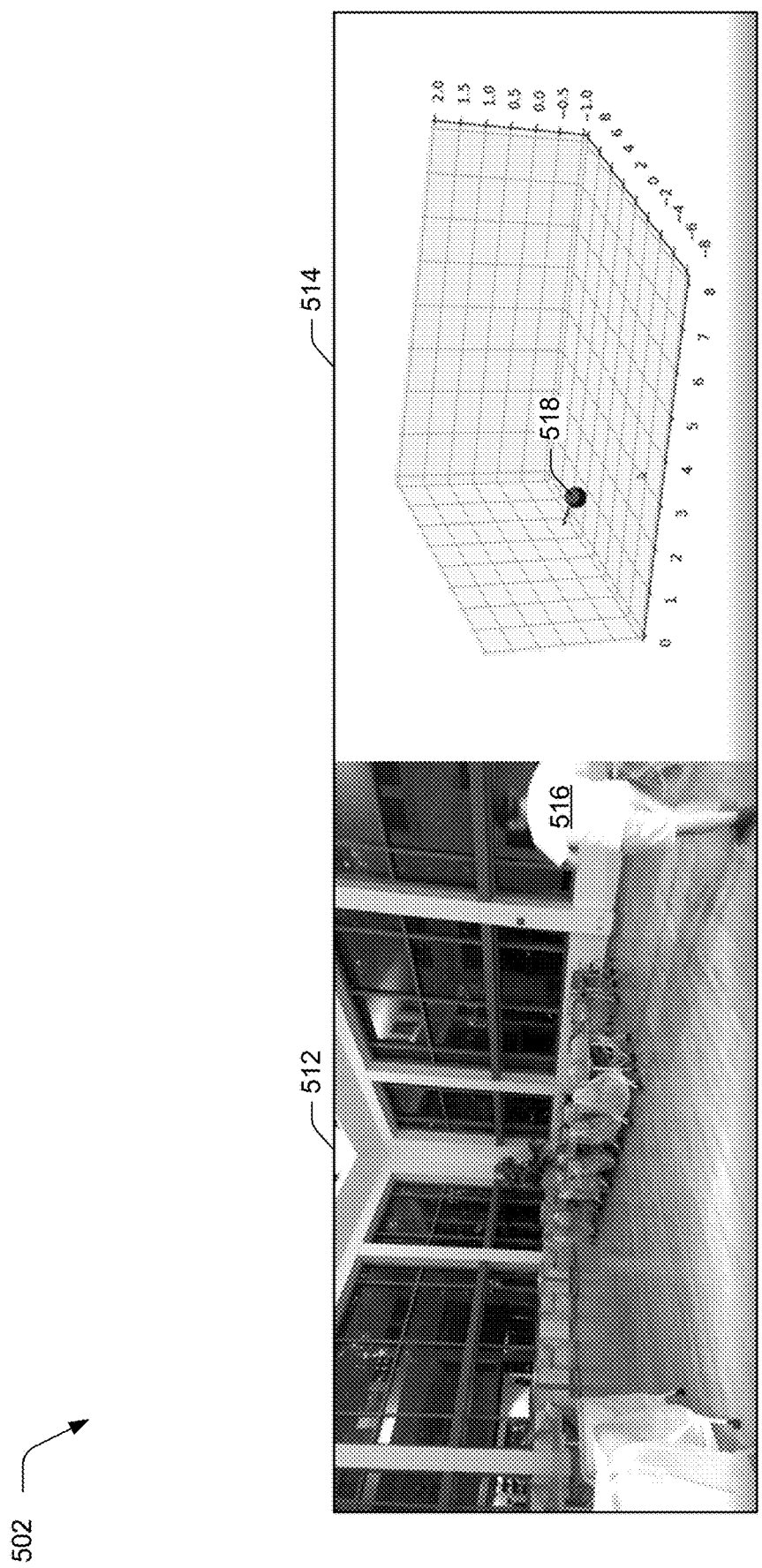
Figure 5C:
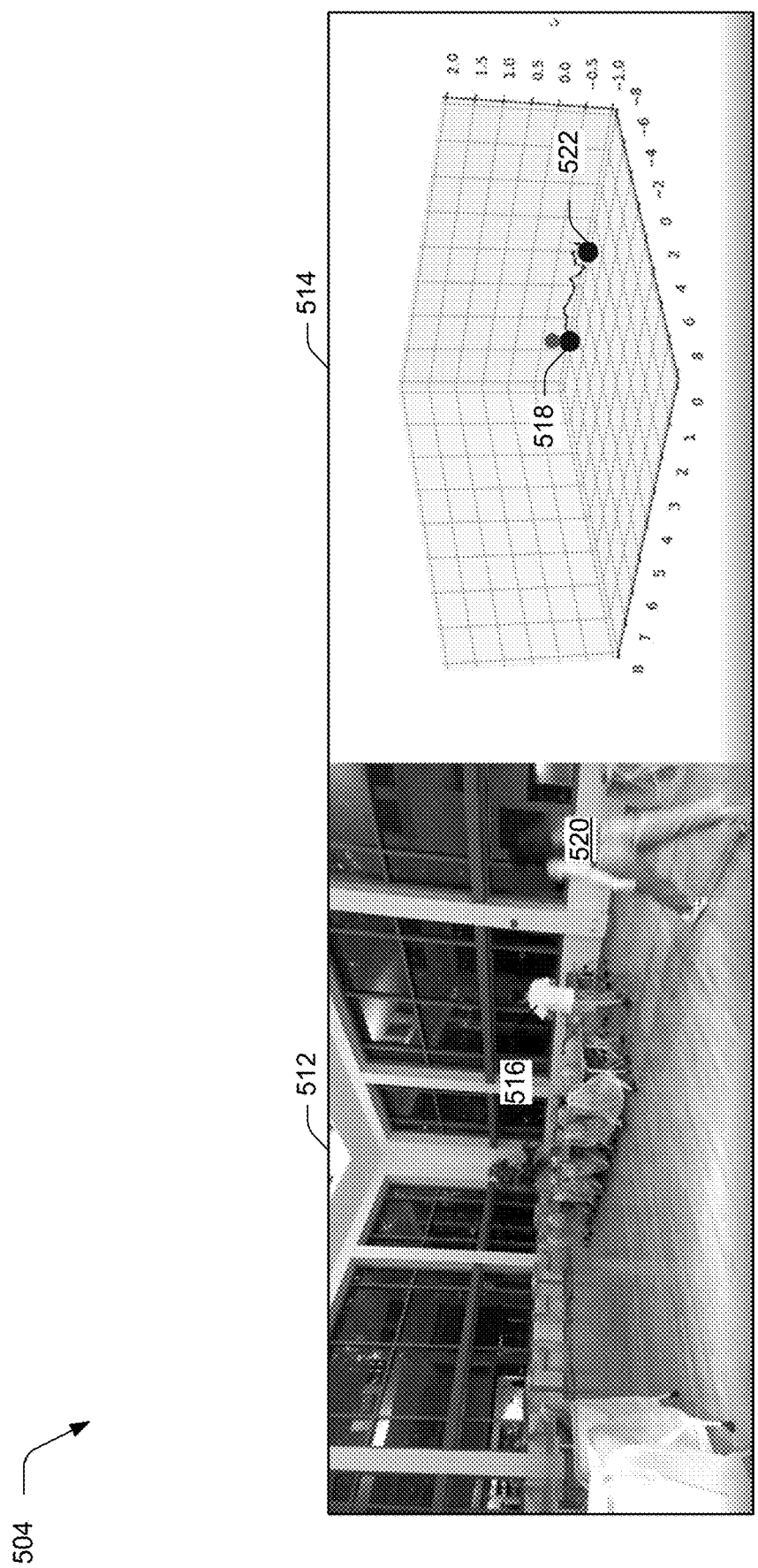
Figure 5D:
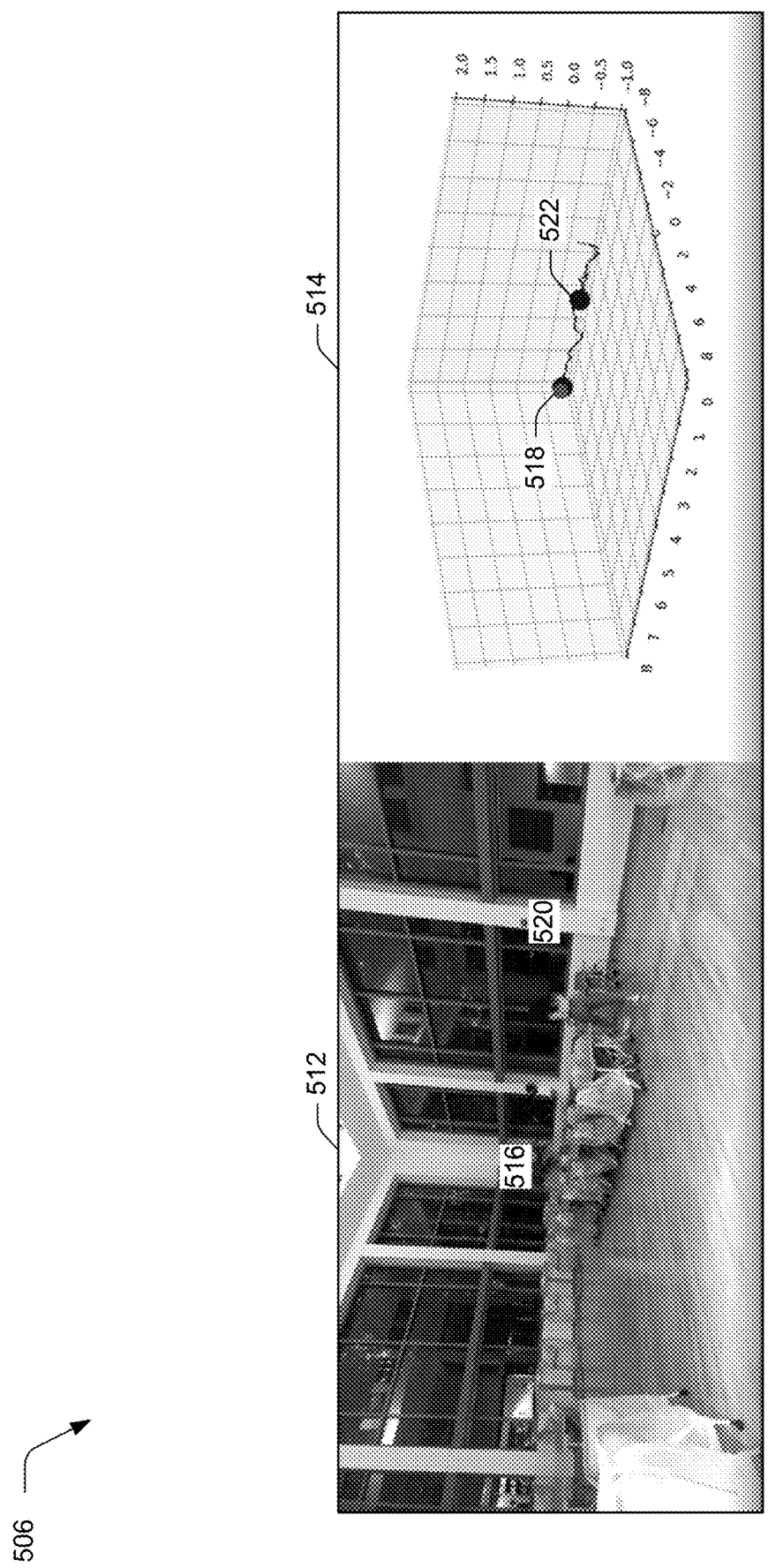
Figure 5E:
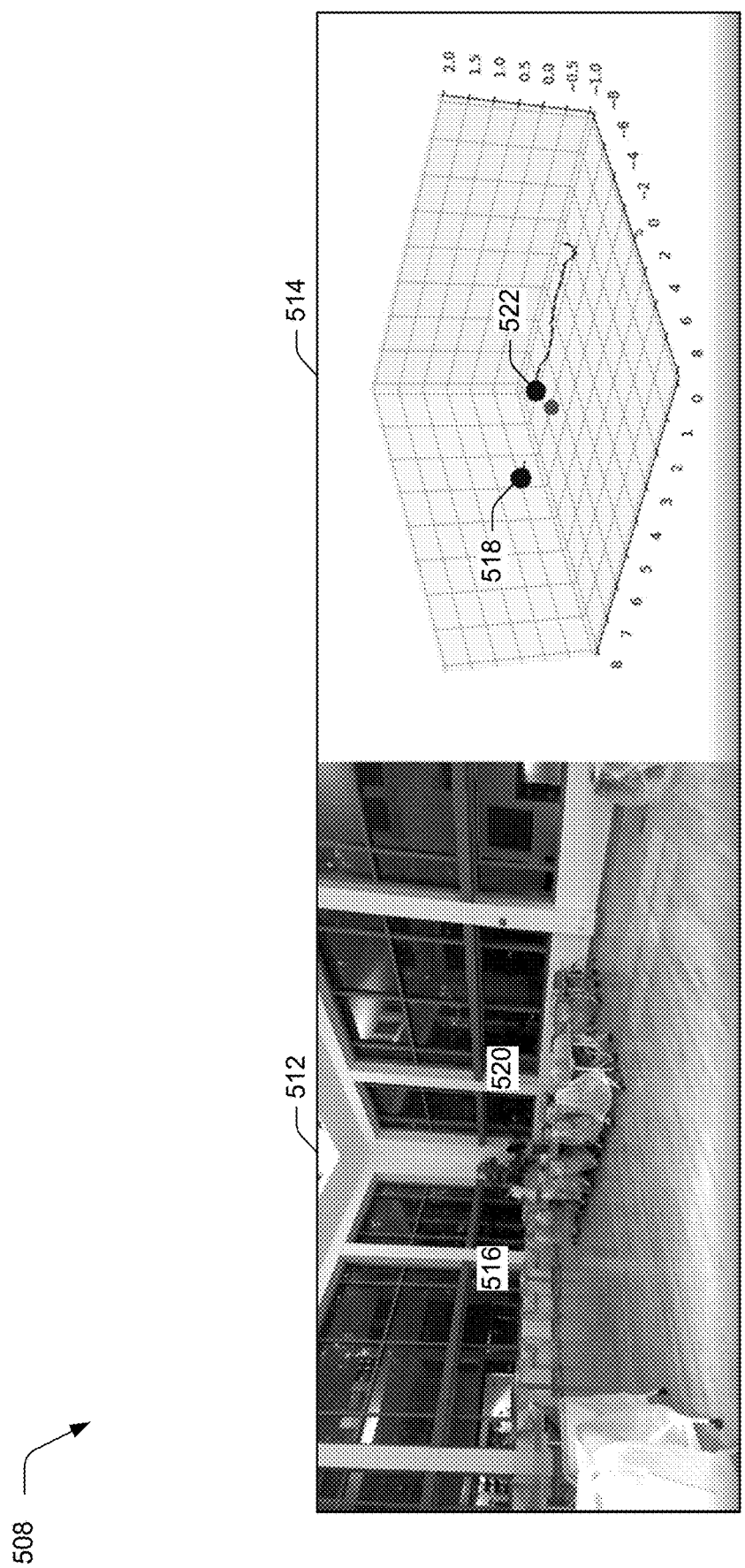
Figure 57:
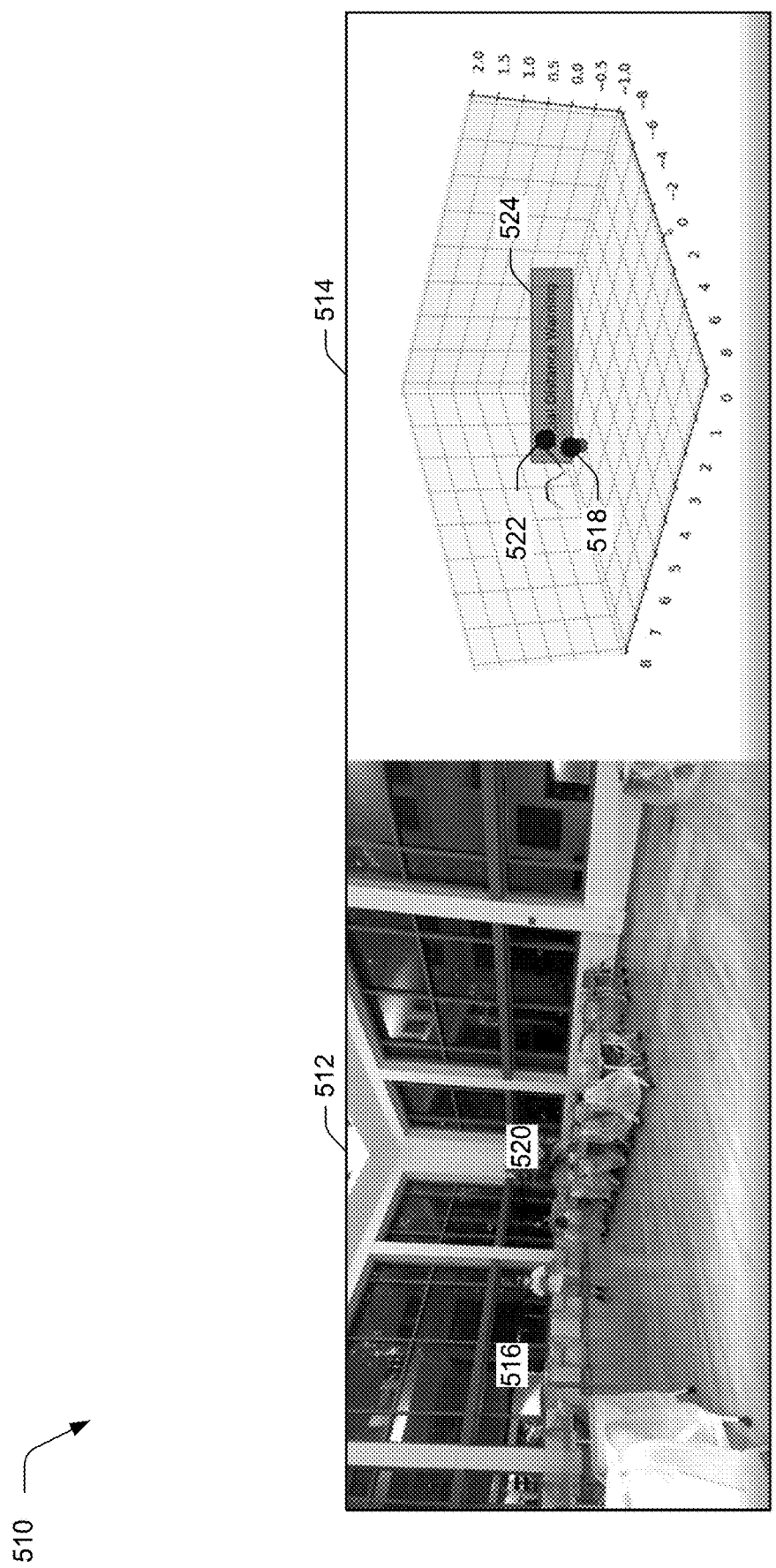

FIGS. 5A, 5B, 5C, 5D, 5E, and 5F illustrate an example of estimating three-dimensional trajectories of physical objects. FIG. 5A illustrates a representation 500 of a physical environment. FIG. 5B illustrates a representation 502 of a first person moving within the physical environment. FIG. 5C illustrates a representation 504 of a second person moving within the physical environment. FIG. 5D illustrates a representation 506 of tracking a three-dimensional position and a three-dimensional velocity of the first person within the physical environment. FIG. 5E illustrates a representation 508 of tracking a three-dimensional position and a three-dimensional velocity of the second person within the physical environment. FIG. 5F illustrates a representation 510 of a generated indication that the first person is within a threshold distance from the second person within the physical environment.

As illustrated in FIG. 5A, the representation 500 includes a physical environment 512 and a three-dimensional representation 514 of the physical environment 512. With respect to FIG. 5B, a first person 516 enters the physical environment 512 and is moving within the physical environment 512. For example, the three-dimensional trajectory module 110 receives radar data 120 describing millimeter length radio waves directed within the physical environment using beamforming and reflected from the first person 516.

The three-dimensional trajectory module 110 generates an indication 518 of a three-dimensional position and a three-dimensional velocity of the first person 516 within the physical environment. The indication 518 is displayed relative to the three-dimensional representation 514. For example, the three-dimensional trajectory module 110 generates the indication 518 without identifying the first person 516. In one example, the three-dimensional trajectory module 110 generates the indication 518 without using an image capture device such as a digital camera.

As depicted in FIG. 3C, a second person 520 enters the physical environment 512 and is also moving within the physical environment 512. In one example, the three-dimensional trajectory module 110 receives radar data 120 describing millimeter length radio waves directed within the physical environment using beamforming and reflected from the first person 516 and the second person 520. The first person 516 has moved to a new three-dimensional position in the physical environment 512 and the indication 518 corresponds to the new three-dimensional position.

The three-dimensional trajectory module 110 generates an indication 522 of a three-dimensional position and a three-dimensional velocity of the second person 520 within the physical environment 512. The indications 518, 522 are displayed relative to the three-dimensional representation 514. For example, the three-dimensional trajectory module 110 generates the indications 518, 522 without identifying the first person 516 or the second person 520 or capturing data usable to identify the first person 516 or the second person 520. In this example, the three-dimensional trajectory module 110 generates the indications 518, 522 without using an image capture device.

With respect to FIG. 5D, the first person 516 has moved to another new three-dimensional position within physical environment 512 which is a corner of the physical environment 512. The three-dimensional trajectory module 110 generates the indication 518 which corresponds to the first person's 516 current position within the three-dimensional environment 512. The second person 520 has also moved to a new three-dimensional position within the physical environment 512. For example, the three-dimensional trajectory module 110 generates the indication 522 which corresponds to the second person's 520 current position within the three-dimensional environment 512.

As illustrated in FIG. 5E, the first person 516 has moved to an additional new three-dimensional position within the physical environment 512. The second person 520 has also moved to another new three-dimensional position within the physical environment 512 which is near the position of the first person 516 illustrated in FIG. 5D. As shown, the three-dimensional trajectory module 110 generates the indication 518 which corresponds to the first person's 516 current position within the three-dimensional environment 512. The three-dimensional trajectory module 110 also generates the indication 522 which corresponds to the second person's 520 current position within the three-dimensional environment 512. The indications 518, 522 are displayed relative to the three-dimensional representation 514.

In the representation 510 illustrated in FIG. 5F, the first person 516 has again moved to a new three-dimensional position within the physical environment 512 and the second person 520 has also moved to a new three-dimensional position within the physical environment 512 which is near the first person 516. The three-dimensional trajectory module 110 generates the indication 518 as corresponding to the first person's 516 current position in the physical environment 512 and the indication 522 as corresponding to the second person's 520 current position in the physical environment 512. For example, the three-dimensional trajectory module 110 determines that the first person 516 and the second person 520 are within a threshold distance within the physical environment 512.

Figure 6A:
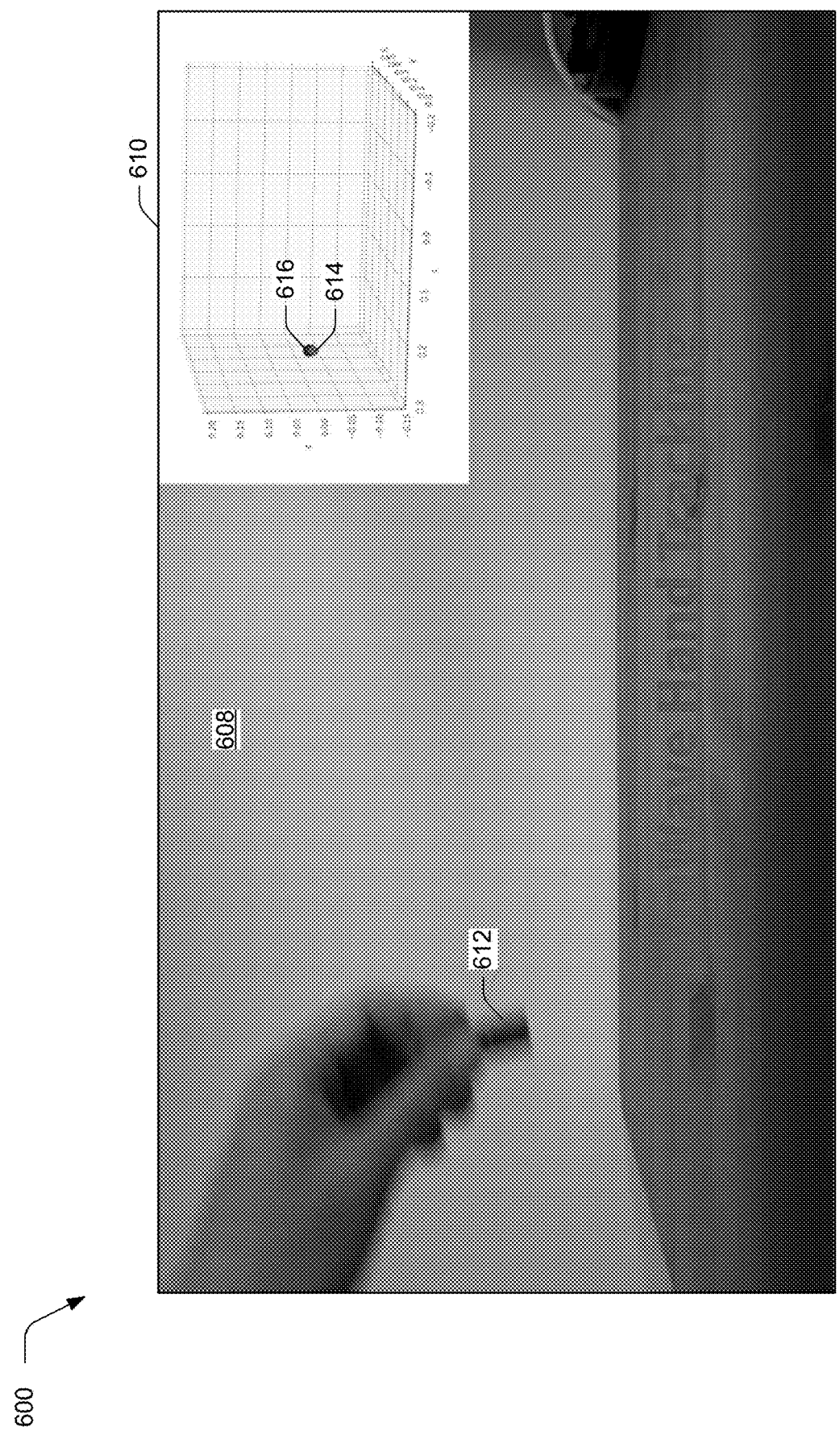
Figure 6B:
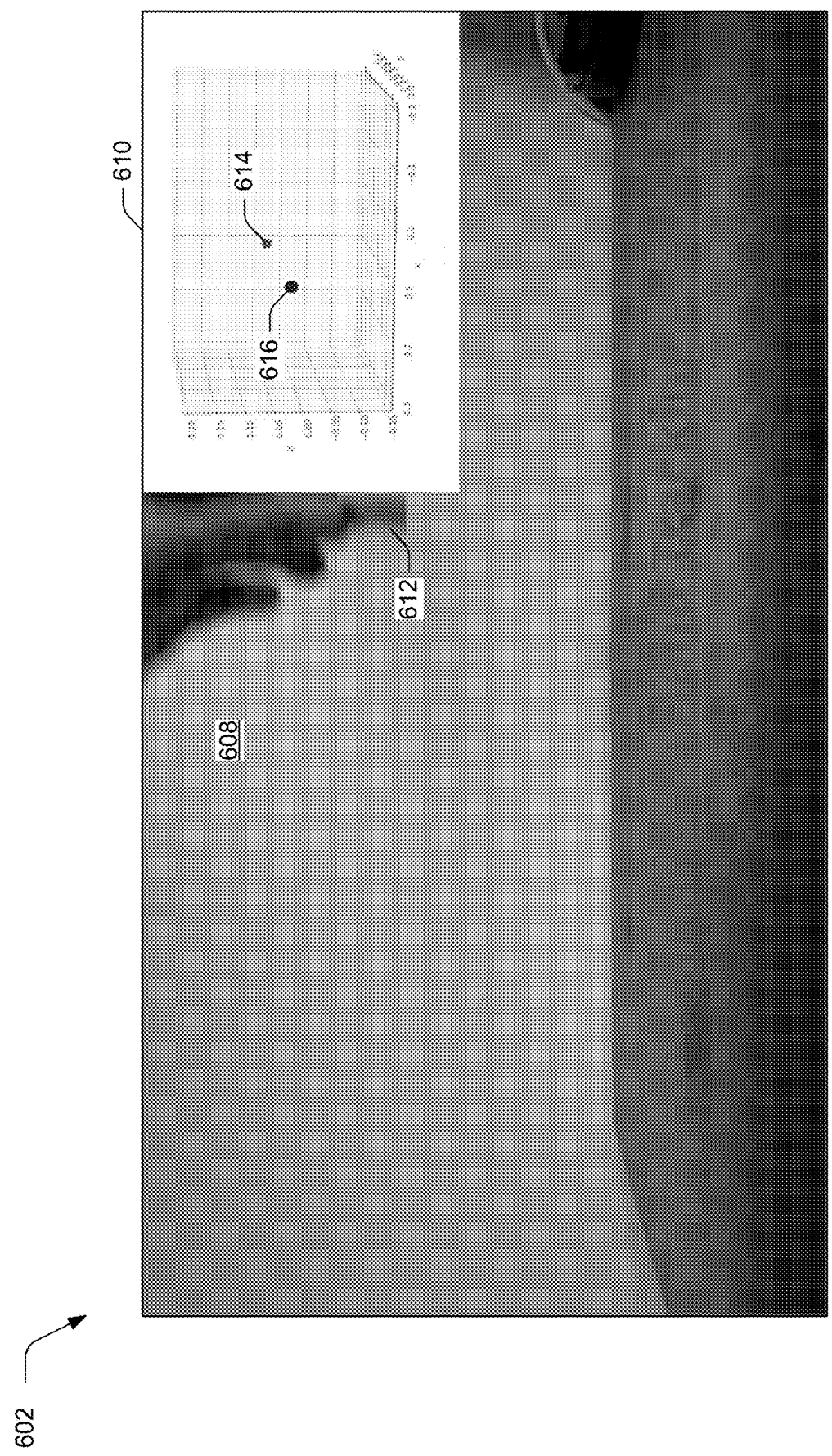
Figure 6D:
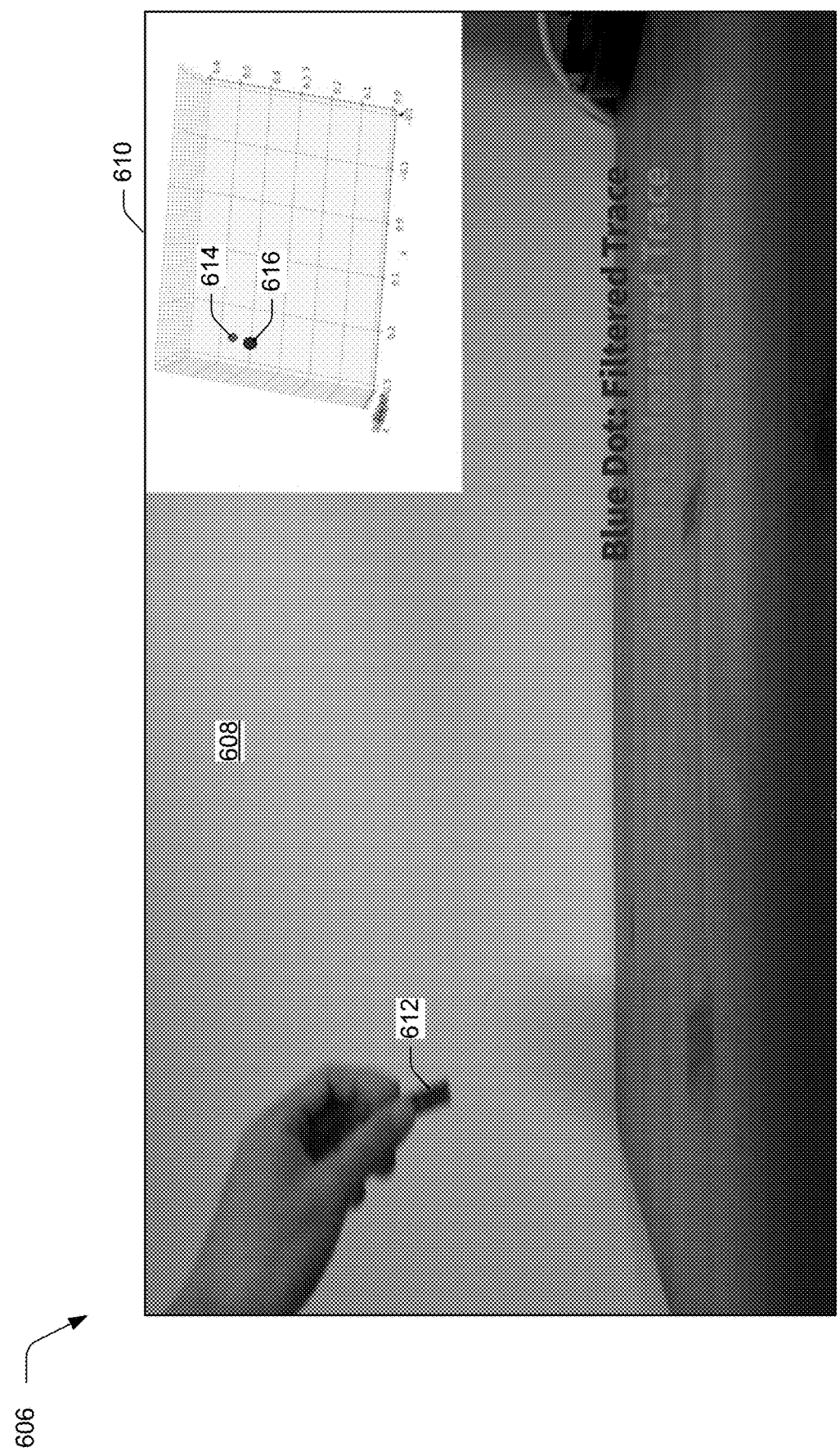

The three-dimensional trajectory module 110 generates and indication 524 that the first person 516 and the second person 520 are within the threshold distance within the physical environment 512. In this example, the indication 524 is a social distance warning. The three-dimensional trajectory module 110 displays the indication 524 relative to the three-dimensional representation 514. In one example, the three-dimensional trajectory module 110 generates and displays the indication 524 without identifying the first person 516 or the second person 520 or capturing data usable to identify the first person 516 or the second person 520. In another example, the three-dimensional trajectory module 110 generates and displays the indication 524 without using an image capture device. 100811 FIGS. 6A, 6B, 6C, and 6D illustrate an example of estimating a three-dimensional trajectory of a physical object. FIG. 6A illustrates a representation 600 of the physical object in a first three-dimensional position. FIG. 6B illustrates a representation 602 of the physical object in a second three-dimensional position. FIG. 6C illustrates a representation 604 of the physical object in a third three-dimensional position. FIG. 6D illustrates a representation 606 of the physical object in a fourth three-dimensional position.

As shown in FIG. 6A, the representation includes a physical environment 608 and a three-dimensional representation 610 of the physical environment 608. A physical object 612 is in the first three-dimensional position within the physical environment 608. In this example, the physical object 612 is a hand holding a portable storage device. The radar system 118 transmits millimeter wavelength radio waves within the physical environment 608 using beamforming and the radio waves reflect from the physical object 612. The radar system 118 receives the reflected millimeter wavelength radio waves and generates the radar data 120 as describing the transmitted and reflected millimeter wavelength radio waves.

The three-dimensional trajectory module 110 receives the radar data 120 and processes the radar data 120 to generate an indication 614 which corresponds to a first measured three-dimensional position in the physical environment 608. The three-dimensional trajectory module 110 accesses the path data 122 and identifies a path object based on the first measured three-dimensional position in the physical environment 608. The three-dimensional trajectory module 110 uses the path object, the first measured three-dimensional position, and the Kalman filter to generate an indication 616 which corresponds to the three-dimensional position of the physical object 612 within the physical environment 608. For example, the first measured three-dimensional position of the physical object 612 includes frame loss and the Kalman filter compensates for such frame loss. The three-dimensional trajectory module 110 displays the indications 614, 616 relative to the three-dimensional representation 610.

With respect to FIG. 6B, the physical object 612 has moved from the first three-dimensional position to the second three-dimensional position within the physical environment 608. The three-dimensional trajectory module 110 generates the indication 614 which corresponds to a second measured three-dimensional position within the physical environment 608. The three-dimensional trajectory module 110 uses the path object, the second measured three-dimensional position, and the Kalman filter to generate the indication 616 which corresponds to the second three-dimensional position of the physical object 612 within the physical environment 608. The indications 614, 616 are displayed relative to the three-dimensional representation 610.

As shown in FIG. 6C, the physical object 612 has moved from the second three-dimensional position to the third three-dimensional position within the physical environment 608. The three-dimensional trajectory module 110 generates the indication 614 which corresponds to a third measured three-dimensional position within the physical environment 608. The three-dimensional trajectory module 110 uses the path object, the third measured three-dimensional position, and the Kalman filter to generate the indication 616 which corresponds to the third three-dimensional position of the physical object 612 within the physical environment 608. As shown, the indications 614, 616 are displayed relative to the three-dimensional representation 610.

With reference to FIG. 6D, the physical object 612 has moved from the third three-dimensional position to the fourth three-dimensional position within the physical environment 608. The three-dimensional trajectory module 110 generates the indication 614 which corresponds to a fourth measured three-dimensional position within the physical environment 608. The three-dimensional trajectory module 110 uses the path object, the fourth measured three-dimensional position, and the Kalman filter to generate the indication 616 which corresponds to the fourth three-dimensional position of the physical object 612 within the physical environment 608. The indications 614, 616 are displayed relative to the three-dimensional representation 610. By leveraging beamforming to transmit millimeter wavelength radio waves within the physical environment 608, the three-dimensional trajectory module 110 is capable of tracking the physical object 612 and estimating trajectories of the physical object 612 within the physical environment 608. In this example, the three-dimensional trajectory module 110 is capable of tracking objects as small as a human hand holding the portable storage device.

Figure 7:
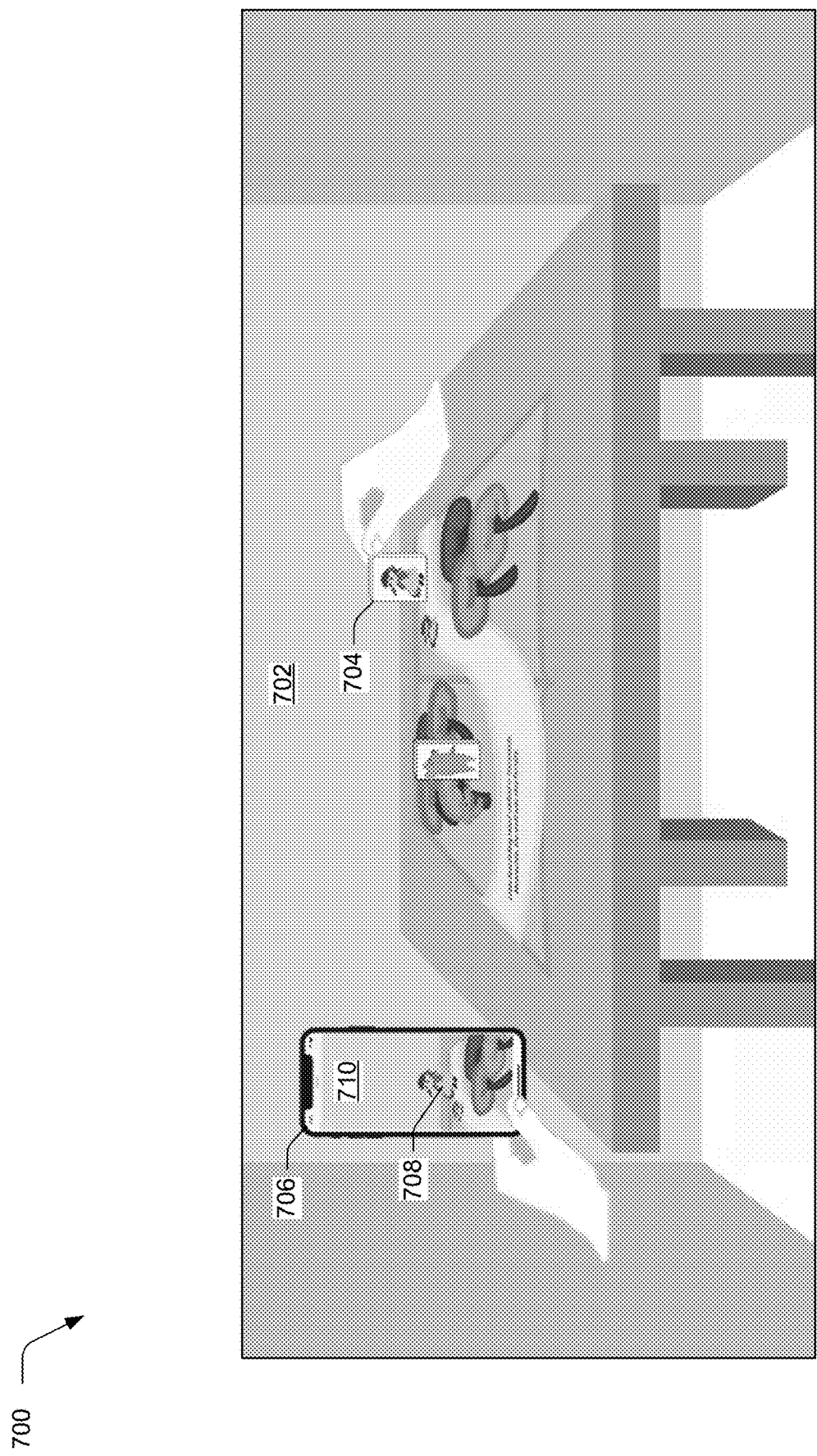
FIG. 7 illustrates an example representation of displaying an estimated trajectory of a physical object as a virtual object in an augmented reality example.

FIG. 7 illustrates an example representation 700 of displaying an estimated three-dimensional trajectory of a physical object as a virtual object in an augmented reality example. Because the three-dimensional trajectory module 110 is capable of tracking objects in three-dimensions, the three-dimensional trajectory module 110 can leverage this tracking in any three-dimensional use scenario such as augmented reality, virtual reality, and so forth. The representation 700 includes a physical environment 702 and a physical object 704. In this example the physical environment 702 includes a table with a storyboard and the physical object 704 is a small tile depicting an animated character.

A mobile device 706 is also included in the physical environment 702. The mobile device 706 includes an image capture device which captures digital video frames depicting the physical environment 702. The three-dimensional trajectory module 110 receives the radar data 120 describing millimeter wavelength radio waves directed within the physical environment 702 using beamforming. The radar data 120 also describes reflected radio waves from the physical object 704.

The three-dimensional trajectory module 110 processes the radar data 120 to generate a virtual object 708 which is displayed relative to the physical object 704 in the digital video frames displayed in a user interface 710 of the mobile device 706. As the physical object 704 moves in the physical environment 702 the virtual object 708 moves in the user interface 710 based on the movement of the physical object 704 in the physical environment 702. For example, the three-dimensional trajectory module 110 maps an indication of the physical object 704 in a three-dimensional representation of the physical environment to user interface 710 which is a two-dimensional display, e.g., using ray casting to project between two dimensions and three-dimensions.

Example System and Device

Figure 8:
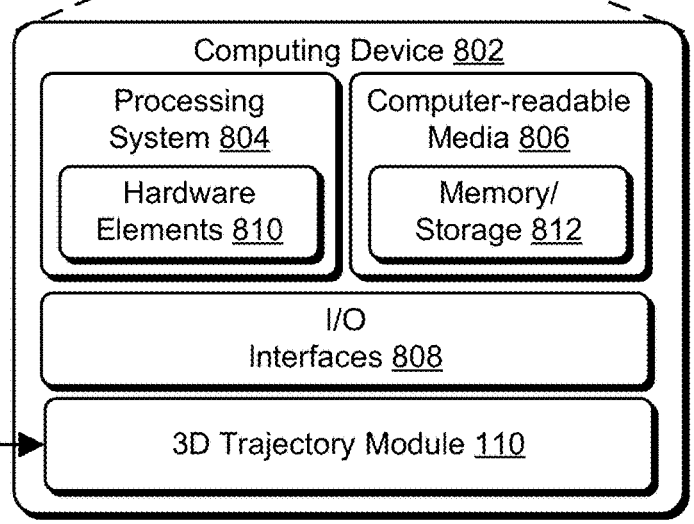
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the three-dimensional trajectory module 110 and the radar system 118. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for estimating three-dimensional trajectories of physical objects have been described in language specific to structural features and/or methods, it is to be understood that the appended claims are not necessarily limited to the specific features or methods described. Rather, the specific features and methods are disclosed as example implementations of systems for generating three-dimensional trajectories of physical objects, and other equivalent features and methods are intended to be within the scope of the appended claims. Further, various different examples are described and it is to be appreciated that each described example is implementable independently or in connection with one or more other described examples.

What is claimed is:

1. A method comprising:
transmitting, by a processing device, millimeter wavelength radio waves directed within a physical environment using beamforming that reflect from physical objects in the physical environment;
receiving, by the processing device, radar data describing the millimeter wavelength radio waves;
generating, by the processing device, a cloud of three-dimensional points based on the radar data, each of the three-dimensional points corresponding to a reflected millimeter wavelength radio wave within a sliding temporal window and removing three-dimensional points corresponding to reflected millimeter wavelength radio waves that have arrival times greater than a threshold arrival time;
determining, by the processing device, a position and a velocity for each of the three-dimensional points in the cloud of three-dimensional points;
removing, by the processing device, additional three-dimensional points having velocities below a threshold velocity from the three-dimensional points within the cloud;
grouping, by the processing device, the three-dimensional points into at least one group based on Euclidean distances between the three-dimensional points within the cloud; and
generating, by the processing device for display in a user interface of a display device, an indication of a three-dimensional trajectory of a physical object corresponding to the at least one group, displayed relative to a current position of the physical object, using a Kalman filter to track a position and a velocity of a centroid of the at least one group in three-dimensions.

2. The method as described in claim 1, wherein the Kalman filter is a six state Kalman filter.

3. The method as described in claim 1, wherein the physical object is a person.

4. The method as described in claim 3, further comprising generating an indication for display in the user interface that the person is within a threshold distance of an additional person within the physical environment.

5. The method as described in claim 3, wherein the indication of the three-dimensional trajectory is generated without identifying the person or capturing data usable to identify the person.

6. The method as described in claim 1, wherein the indication of the three-dimensional trajectory is generated without using a digital camera.

7. The method as described in claim 1, wherein the sliding temporal window corresponds to period of time that is less than 300 milliseconds.

8. The method as described in claim 1, wherein the indication of the three-dimensional trajectory is displayed in the user interface as a virtual object relative to the physical object in digital video frames depicting the physical environment.

9. The method as described in claim 1, wherein the grouping includes performing density-based spatial clustering of applications with noise.

10. A system comprising:
a memory component; and
a processing device coupled to the memory component, the processing device to perform operations comprising:
transmitting millimeter wavelength radio waves directed within a physical environment using beamforming that reflect from physical objects in the physical environment
receiving radar data describing the millimeter wavelength radio waves; and
generating a cloud of three-dimensional points based on the radar data, each of the three-dimensional points corresponding to a reflected millimeter wavelength radio wave within a sliding temporal window and removing three-dimensional points corresponding to reflected millimeter wavelength radio waves that have arrival times greater than a threshold arrival time;
determining a position and a velocity for each of the three-dimensional points in the cloud of three-dimensional points;
removing additional three-dimensional points having velocities below a threshold velocity from the three-dimensional points within the cloud;
grouping the three-dimensional points into at least one group based on Euclidean distances between the three-dimensional points within the cloud; and
generating, for display in a user interface of a display device, an indication of a three-dimensional trajectory of a physical object corresponding to the at least one group, displayed relative to a current position of the physical object, using a Kalman filter to track a position and a velocity of a centroid of the at least one group in three-dimensions.

11. The system as described in claim 10, wherein the physical object is a person.

12. The system as described in claim 11, wherein the indication of the three-dimensional trajectory is generated without identifying the person or capturing data usable to identify the person.

13. The system as described in claim 11, wherein operations further comprise generating an indication for display in the user interface that the person is within a threshold distance of an additional person within the physical environment.

14. The system as described in claim 10, wherein the indication of the three-dimensional trajectory is displayed in the user interface as a virtual object relative to the physical object in digital video frames depicting the physical environment.

15. The system as described in claim 10, wherein the operations further comprise accessing path data describing path objects corresponding to detections of the physical objects in the physical environment and associate the physical object with a particular path object based on a distance between the centroid and a center of the particular path object.

16. A non-transitory computer-readable storage medium storing executable instructions, which when executed by a processing device, cause the processing device to perform operations comprising:
   transmitting millimeter wavelength radio waves directed within a physical environment using beamforming that reflect from physical objects in the physical environment
   receiving radar data describing the millimeter wavelength radio waves;
   generating a cloud of three-dimensional points based on the radar data, each of the three-dimensional points corresponding to a reflected millimeter wavelength radio wave within a sliding temporal window and removing three-dimensional points corresponding to reflected millimeter wavelength radio waves that have arrival times greater than a threshold arrival time;
   determining a position and a velocity for each of the three-dimensional points in the cloud of three-dimensional points;
   removing additional three-dimensional points having velocities below a threshold velocity from the three-dimensional points within the cloud;
   grouping the three-dimensional points into at least one group based on Euclidean distances between the three-dimensional points within the cloud, the Euclidean distances computed in an x-plane, a y-plane, and a z-plane; and
   generating, for display in a user interface of a display device, an indication of a three-dimensional trajectory of a physical object corresponding to the at least one group, displayed relative to a current position of the physical object, using a Kalman filter to track a velocity and a position of a centroid of the at least one group in the x-plane, the y-plane, and the z-plane.

17. The non-transitory computer-readable storage medium as described in claim 16, wherein the operations further comprise associating the physical object with a particular path object of a plurality of path objects based on a distance between the centroid and a center of the particular path object.

18. The non-transitory computer-readable storage medium as described in claim 16, wherein the physical object is a person.

19. The non-transitory computer-readable storage medium as described in claim 18, wherein the indication of the three-dimensional trajectory is generated without identifying the person or capturing data usable to identify the person.

20. The non-transitory computer-readable storage medium as described in claim 18, wherein the indication of the three-dimensional trajectory is generated without using a digital camera.

* * * * *